United States Patent
Dong et al.

(10) Patent No.: US 12,451,973 B2
(45) Date of Patent: Oct. 21, 2025

(54) PORT IDENTIFICATION METHOD AND APPARATUS

(71) Applicant: Huawei Technologies Co., Ltd., Shenzhen (CN)

(72) Inventors: Zhenhua Dong, Dongguan (CN); Xiaolong Dong, Dongguan (CN); Chao Jin, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 300 days.

(21) Appl. No.: 18/308,308

(22) Filed: Apr. 27, 2023

(65) Prior Publication Data

US 2023/0261757 A1 Aug. 17, 2023

Related U.S. Application Data

(63) Continuation of application No. PCT/CN2021/111865, filed on Aug. 10, 2021.

(30) Foreign Application Priority Data

Oct. 29, 2020 (CN) .......................... 202011183533.X

(51) Int. Cl.
*H04B 10/07* (2013.01)
*H04B 10/294* (2013.01)
(Continued)

(52) U.S. Cl.
CPC ......... *H04B 10/572* (2013.01); *H04B 10/294* (2013.01); *H04B 10/07* (2013.01);
(Continued)

(58) Field of Classification Search
CPC .. H04B 10/572; H04B 10/294; H04B 10/272; H04B 10/071; H04B 10/07;
(Continued)

(56) References Cited

U.S. PATENT DOCUMENTS

| | | | | |
|---|---|---|---|---|
| 5,177,354 A | * | 1/1993 | Tomita | G02B 6/4246 356/73.1 |
| 5,383,015 A | * | 1/1995 | Grimes | G01M 11/3154 356/73.1 |

(Continued)

FOREIGN PATENT DOCUMENTS

| | | |
|---|---|---|
| CN | 111010228 A | 4/2020 |
| CN | 111130636 A | 5/2020 |
| CN | 111327975 A | 6/2020 |

OTHER PUBLICATIONS

Bentz Christopher:"Measurements of a novel FTTH/PON Monitoring Technique based on Unique Wavelength-Selective Mirror Combinations using Composite Coding Scheme OTDR for SNR Enhancement". Jul. 5, 2013, total 7 pages.

*Primary Examiner* — Dibson J Sanchez
(74) *Attorney, Agent, or Firm* — Slater Matsil, LLP

(57) ABSTRACT

This application provides a port identification method. The method includes: obtaining reflection information of reflection peaks formed by each ONT by separately reflecting test light when the test light provided by a wavelength-tunable device is transmitted in the PON; determining, based on the reflection information of the reflection peaks, a port of a splitter corresponding to each reflection peak group, where each reflection peak group includes reflection peaks formed by a same ONT by reflecting the test light; and determining, based on first transmission information of at least one reflection peak in each reflection peak group, the port of the splitter corresponding to each reflection peak group, and second transmission information between each ONT and an OLT, a port corresponding to each ONT in the splitter. According to this application, port identification efficiency can be improved.

20 Claims, 11 Drawing Sheets

(51) Int. Cl.
*H04B 10/572* (2013.01)
*H04B 10/071* (2013.01)
*H04Q 11/00* (2006.01)

(52) U.S. Cl.
CPC ........ *H04B 10/071* (2013.01); *H04Q 11/0067* (2013.01); *H04Q 2011/0083* (2013.01)

(58) Field of Classification Search
CPC ....... H04Q 2011/0083; H04Q 11/0067; H04Q 11/0062; H04J 14/0202
USPC .......................................... 398/9–38, 43–103
See application file for complete search history.

(56) References Cited

U.S. PATENT DOCUMENTS

| | | | | |
|---|---|---|---|---|
| 5,491,573 A | * | 2/1996 | Shipley | H04B 10/071 356/73.1 |
| 5,506,674 A | * | 4/1996 | Inoue | G02B 6/447 356/73.1 |
| 6,771,358 B1 | * | 8/2004 | Shigehara | H04B 10/071 356/73.1 |
| 7,800,744 B2 | * | 9/2010 | Lai | H04J 14/0282 356/73.1 |
| 9,281,892 B2 | * | 3/2016 | Urban | H04B 10/071 |
| 2006/0110161 A1 | * | 5/2006 | Cho | H04J 14/0246 398/72 |
| 2007/0053631 A1 | * | 3/2007 | Yeh | G02B 6/29317 385/24 |
| 2008/0291431 A1 | * | 11/2008 | Wang | G01M 11/3136 356/73.1 |
| 2009/0263123 A1 | * | 10/2009 | Zhu | H04B 10/071 398/16 |
| 2009/0269053 A1 | * | 10/2009 | Yang | H04L 41/0677 398/22 |
| 2012/0263458 A1 | * | 10/2012 | Wen | H04B 10/071 398/28 |
| 2013/0051791 A1 | * | 2/2013 | Zhao | H04J 14/0282 398/17 |
| 2014/0072296 A1 | | 3/2014 | Montalvo Garcia et al. | |
| 2016/0036523 A1 | * | 2/2016 | Zhao | H04B 10/0773 398/21 |
| 2016/0173194 A1 | * | 6/2016 | Zhou | H04B 10/071 398/21 |
| 2016/0241330 A1 | * | 8/2016 | Sanchez Yanguela | H04B 10/071 |
| 2019/0280767 A1 | * | 9/2019 | Haber | H04B 10/2537 |

* cited by examiner

PORT IDENTIFICATION METHOD AND APPARATUS

CROSS-REFERENCE TO RELATED APPLICATIONS

This application is a continuation of international application No. PCT/CN2021/111865, filed on Aug. 10, 2021, which claims priority to Chinese Patent Application No. 202011183533.X, filed on Oct. 29, 2020. The disclosures of the aforementioned applications are hereby incorporated by reference in their entireties.

TECHNICAL FIELD

This application relates to the field of optical fiber communication technologies, and in particular, to a port identification method and apparatus.

BACKGROUND

With development of optical fiber communication technologies, a passive optical network (PON) is rapidly developed and deployed on a large scale. The PON is a point-to-multipoint system, and includes an optical line terminal (OLT), an optical distribution network (ODN), and an optical network terminal (ONT) that are sequentially connected. The ODN is a passive optical network, and includes only passive devices, mainly including an optical fiber and a splitter. The ODN transmits an optical signal from the OLT to the ONT through a point-to-point connection method. The ODN has characteristics such as a wide coverage area, a large amount of branch optical path data, and a complex scenario. In addition, the ODN has no power supplying. All these make it difficult to locate and check a fault in the ODN. Accuracy of the fault locating is particularly important. To implement the fault locating, it is necessary to accurately identify a port of a splitter connected to the ONT in the ODN.

In a related technology, when an ONT is manually installed, a port of a splitter connected to the ONT is generally recorded. Because there are a large quantity of ONTs and there are a large quantity of splitters in the ODN, it takes a long period of time to distinguish the port of the splitter connected to the ONT.

SUMMARY

This application provides a port identification method and apparatus, to improve port identification efficiency. Technical solutions are as follows.

According to a first aspect, this application provides a port identification method. The method is applied to a PON. The PON includes at least one level of splitter and at least one ONT. Each of the at least one ONT is separately connected to a different port of the at least one level of splitter through an optical fiber. Reflection components are disposed on ports of the at least one level of splitter. Wavelengths of test light reflected by reflection components of different ports of a same splitter are different. The method includes: obtaining reflection information of reflection peaks formed by each ONT by separately reflecting test light when the test light provided by a wavelength-tunable device is transmitted in the PON, where the test light includes test light reflected by the reflection components of the ports of the at least one level of splitter, and the reflection information includes at least heights of the reflection peaks; determining, based on the reflection information of the reflection peaks, a port of a splitter corresponding to each reflection peak group, where each reflection peak group includes reflection peaks formed by a same ONT by reflecting the test light; and determining, based on first transmission information corresponding to at least one reflection peak in each reflection peak group, the port of the splitter corresponding to each reflection peak group, and second transmission information between each ONT and an OLT, the port corresponding to each ONT in the splitter.

In the solution in this application, the port identification method is applied to the PON. The PON includes the at least one level of splitter and the at least one ONT. Each ONT is connected to a different port of the at least one level of splitter through the optical fiber. Different ONTs are connected to different ports. Reflection components are disposed on the ports of the at least one level of splitter. The wavelengths of the test light reflected by the reflection components of different ports of the same splitter are different. An execution body of the port identification method may be a port identification device.

The port identification device obtains the reflection information of the reflection peaks formed by each ONT by separately reflecting the test light when the test light provided by the wavelength-tunable device is transmitted in the PON. The reflection information includes at least the heights of the reflection peaks. Then, the port identification device determines, based on the reflection information of the reflection peaks, the port of the splitter corresponding to each reflection peak group. Each reflection peak group includes the reflection peaks formed by the same ONT by reflecting the test light. Different reflection peak groups correspond to different ONTs. Then, the port identification device determines, based on the first transmission information corresponding to the at least one reflection peak in each reflection peak group, the port of the splitter corresponding to each reflection peak group, and the second transmission information between each ONT and the OLT, the port corresponding to each ONT in the splitter. If the at least one level of splitter is one level of splitter, the port corresponding to each ONT in the splitter is a port that is directly connected to each ONT in the splitter. If the at least one level of splitter is a plurality of levels of splitters, a connection relationship of the port corresponding to each ONT in the splitter includes a connection relationship of a port that is directly connected to each ONT in the splitter, and a connection relationship between the splitter that is directly connected to each ONT and another level of splitter. In this way, the port connected to the ONT in the splitter may be determined by using the reflection peak formed by the test light, and manual recording is not needed. Therefore, port identification efficiency can be improved.

In a possible implementation, the determining, based on the reflection information of the reflection peaks, a port of a splitter corresponding to each reflection peak group includes: determining, based on locations and the heights of the reflection peaks, the port of the splitter corresponding to each reflection peak group; or determining, based on time information and the heights of the reflection peaks, the port of the splitter corresponding to each reflection peak group, where time information of any reflection peak is duration used by the wavelength-tunable device to transmit test light corresponding to the reflection peak to an ONT corresponding to the reflection peak.

The location of the reflection peak is for reflecting a distance between the ONT to which the reflection peak belongs and the wavelength-tunable device. The height of the reflection peak is for reflecting the receive power of the test light corresponding to the reflection peak received by the wavelength-tunable device. The time information of the reflection peak is the duration used by the wavelength-tunable device to transmit the test light corresponding to the reflection peak to the ONT corresponding to the reflection peak.

In the solution in this application, the port identification device may determine, by using a location and a height of each reflection peak, the port of the splitter corresponding to each reflection peak group. Alternatively, the port identification device may determine, by using the time information and the heights of the reflection peaks, the port of the splitter corresponding to each reflection peak group. In this way, the port of the splitter corresponding to the reflection peak group can be accurately determined.

In a possible implementation, when the first transmission information is a location, the second transmission information is a transmission distance; when the first transmission information is a height, the second transmission information is a transmission loss; when the first transmission information is a location and a height, the second transmission information is a transmission distance and a transmission loss; when the first transmission information is time information, the second transmission information is transmission duration; or when the first transmission information is time information and a transmission loss, the second transmission information is transmission duration and a transmission loss. The time information of any reflection peak is the duration used by the wavelength-tunable device to transmit the test light corresponding to the reflection peak to the ONT corresponding to the reflection peak. In this way, the port connected to the ONT in the splitter can be determined efficiently and accurately.

In a possible implementation, the method further includes: obtaining reflection information of a reflection peak formed by each ONT by reflecting target test light when the target test light provided by the wavelength-tunable device is transmitted in the PON, where a wavelength of the target test light is different from wavelengths of the test light reflected by the reflection components of the ports of the at least one level of splitter; and the determining, based on locations and the heights of the reflection peaks, the port of the splitter corresponding to each reflection peak group includes: determining, based on the locations and the heights of the reflection peaks and a location and a height of the reflection peak formed by the target test light, the port of the splitter corresponding to each reflection peak group. In this way, because the location and the height of the reflection peak formed by the target test light are used as a location and a height of a reflection peak formed by test light that is not reflected by the reflection component, a reflection peak whose height decreases can be found more quickly, so that the port of the splitter corresponding to each reflection peak group can be determined more quickly.

In a possible implementation, the at least one level of splitter is an even splitter, the at least one level of splitter is n levels of splitters, and n is greater than or equal to 2. The at least one ONT is connected to a level-n splitter. Wavelengths of test light reflected by reflection components of ports of different levels of splitters are different. The determining, based on the locations and the heights of the reflection peaks and a location and a height of the reflection peak formed by the target test light, the port of the splitter corresponding to each reflection peak group includes: determining, based on the location and the height of the reflection peak formed by the target test light and a location and a height of a reflection peak formed by test light of a level-(i−1) splitter in the test light, a reflection peak corresponding to a same level-i splitter in each reflection peak group, and a port of the level-(i−1) splitter connected to a level-i splitter, where the test light of the level-(i−1) splitter is test light reflected by a reflection component of the port of the level-(i−1) splitter, and i is greater than 1 and less than or equal to n; determining, based on the location and the height of the reflection peak formed by the target test light and a location and a height of a reflection peak formed by test light of the level-n splitter in the test light, a port of the level-n splitter corresponding to each reflection peak group, where the test light of the level-n splitter is test light reflected by a reflection component of the port of the level-n splitter; and determining, based on the reflection peak corresponding to the same level-i splitter in each reflection peak group, the port of the level-(i−1) splitter connected to the level-i splitter, and the port of the level-n splitter corresponding to each reflection peak group, the port of the splitter corresponding to each reflection peak group.

In the solution in this application, the reflection peak corresponding to the same level-i splitter in each reflection peak group, and the port of the level-(i−1) splitter connected to the level-i splitter may be first determined, and then the port of the level-n splitter corresponding to each reflection peak group may be determined. Finally, the port of the splitter corresponding to each reflection peak group can be accurately and quickly determined with reference to this content.

In a possible implementation, the at least one level of splitter is an even splitter, the at least one level of splitter is n levels of splitters, and n is greater than or equal to 2. The at least one ONT is connected to a level-n splitter. Wavelengths of test light reflected by reflection components of ports of different levels of splitters are the same. The determining, based on the locations and the heights of the reflection peaks and a location and a height of the reflection peak formed by the target test light, the port of the splitter corresponding to each reflection peak group includes: determining the reflection peak group based on the locations of the reflection peaks formed by the test light and the location of the reflection peak formed by the target test light; and determining, for a reflection peak group j, based on differences between the height of the reflection peak formed by the target test light and the heights of the reflection peaks formed by the test light in the reflection peak group j, a port of a splitter corresponding to the reflection peak group j.

In the solution in this application, the port identification device may use the locations and the heights of the reflection peaks formed by each ONT by separately reflecting the test light, to regard, in the reflection peaks formed by different test light, reflection peaks whose locations are the same or whose location difference is less than a specific value as reflection peaks formed by an ONT by reflecting the test light. That is, a reflection peak group is formed. For each reflection peak group, the port identification device obtains a difference between the height of the reflection peak formed by the target test light in the reflection peak group and a height of another reflection peak. The difference is used to determine the port of the splitter corresponding to the reflection peak group j. In this way, because the location and the height of the reflection peak formed by the target test light are used as a location and a height of a reflection peak formed by test light that is not reflected by the reflection component, a reflection peak whose height decreases can be found more quickly, so that the port of the splitter corresponding to each reflection peak group can be determined more quickly.

In a possible implementation, the at least one level of splitter is an uneven splitter, the at least one level of splitter is n levels of splitters, and n is greater than or equal to 2. The determining, based on the locations and the heights of the reflection peaks and a location and a height of the reflection peak formed by the target test light, the port of the splitter corresponding to each reflection peak group includes: determining, based on the location and the height of the reflection peak formed by the target test light and a location and a height of a reflection peak formed by test light corresponding to a first port of the at least one level of splitter, a level number of the splitter corresponding to each reflection peak group, where the test light corresponding to the first port is test light reflected by a reflection component of the first port; determining, based on the location and the height of the reflection peak formed by the target test light and a location and a height of a reflection peak formed by test light corresponding to a second port of the at least one level of splitter, a port of a splitter that is directly connected to an ONT to which each reflection peak group belongs, where the test light corresponding to the second port is test light reflected by a reflection component of the second port; and determining, based on the level number of the splitter corresponding to each reflection peak group and the port of the splitter that is directly connected to the ONT to which each reflection peak group belongs, the port of the splitter corresponding to each reflection peak group.

In the solution in this application, the first port is a port connected to a next-level splitter, and the second port is a port connected to an ONT. The level number of the splitter corresponding to each reflection peak group may be first determined and then the port of the splitter that is directly connected to the ONT to which each reflection peak group belongs may be determined. Finally, the port of the splitter corresponding to each reflection peak group can be accurately and quickly determined with reference to this content. In this way, the port of the splitter corresponding to the reflection peak group can be determined quickly and accurately.

In a possible implementation, when the first transmission information is a location and a height, the second transmission information is a transmission distance and a transmission loss. The determining, based on first transmission information corresponding to at least one reflection peak in each reflection peak group, the port of the splitter corresponding to each reflection peak group, and second transmission information between each ONT and an OLT, the port corresponding to each ONT in the splitter includes: determining, based on the location of the reflection peak formed by the target test light in each reflection peak group, a transmission distance between the ONT to which each reflection peak group belongs and the wavelength-tunable device, and determining, based on the height of the reflection peak formed by the target test light in each reflection peak group, a transmission loss between the ONT to which each reflection peak group belongs and the wavelength-tunable device; determining, based on a transmission distance and a transmission loss between each ONT and the OLT, and the transmission distance and the transmission loss between the ONT to which each reflection peak group belongs and the wavelength-tunable device, a reflection peak group corresponding to each ONT; and determining, based on the reflection peak group corresponding to each ONT and the port of the splitter corresponding to each reflection peak group, the port corresponding to each ONT in the splitter.

In the solution in this application, the location of the reflection peak formed by the target test light in each reflection peak group may be used to determine the transmission distance between the ONT to which each reflection peak group belongs and the wavelength-tunable device. Then, the height of the reflection peak formed by the target test light in each reflection peak group may be used to determine the transmission loss between the ONT to which each reflection peak group belongs and the wavelength-tunable device. Then, the transmission distance and the transmission loss between each ONT and the OLT, and the transmission distance and the transmission loss between the ONT to which each reflection peak group belongs and the wavelength-tunable device may be used to determine the reflection peak group corresponding to each ONT. Finally, the reflection peak group corresponding to each ONT and the port of the splitter corresponding to each reflection peak group may be used to determine the port corresponding to each ONT in the splitter. In this way, because the port corresponding to each ONT in the splitter is determined by using the transmission loss and the transmission duration, and a plurality of angles are considered, the port corresponding to each ONT in the splitter can be accurately determined.

In a possible implementation, in the optical fiber used by the at least one ONT to connect to the splitter, a reflection component that reflects the test light is disposed at a location of an interface connected to the at least one ONT. Alternatively, a reflection component that reflects the test light is disposed inside the at least one ONT. In this way, more diversified port identification can be performed.

In a possible implementation, the method further includes: sending an obtaining request of the second transmission information to each ONT; and receiving the second transmission information separately sent by the at least one ONT. In this way, the second transmission information may be obtained from the ONT.

In a possible implementation, the method further includes: sending a test command to the wavelength-tunable device. The test command includes the wavelengths of the test light. Alternatively, the test command includes the wavelengths and an emitting sequence of the test light. The obtaining reflection information of reflection peaks formed by each ONT by separately reflecting test light when the test light provided by a wavelength-tunable device is transmitted in the PON includes: receiving the reflection information of the reflection peaks formed by each ONT by separately reflecting the test light when the test light sent by the wavelength-tunable device is transmitted in the PON. In this way, the wavelength-tunable device can be better controlled.

According to a second aspect, this application provides a port identification apparatus. The apparatus includes one or more modules, configured to implement the port identification method according to the first aspect.

According to a third aspect, a port identification system is provided, and used in a PON. The system includes a wavelength-tunable device and a port identification device. The wavelength-tunable device is configured to output test light of a plurality of wavelengths, and configured to record reflection information of a reflection peak. The port identification device establishes a communication connection to the wavelength-tunable device, and the port identification device is configured to perform the port identification method according to the first aspect.

According to a fourth aspect, a port identification device is provided. The port identification device includes a processor and a memory, where the memory stores computer instructions; and the processor executes the computer instructions, to implement the port identification method according to the first aspect.

According to a fifth aspect, a computer-readable storage medium is provided. The computer-readable storage medium stores computer instructions. When the computer instructions in the computer-readable storage medium are executed by a port identification device, the port identification device is enabled to perform the port identification method according to the first aspect.

According to a sixth aspect, this application provides a computer program product. The computer program product includes computer instructions. When the computer instructions are executed by a port identification device, the port identification device performs the port identification method according to the first aspect.

DESCRIPTION OF EMBODIMENTS

To make objectives, technical solutions, and advantages of this application clearer, the following further describes implementations of this application in detail with reference to the accompanying drawings.

To facilitate understanding of embodiments of this application, the following first describes concepts of involved nouns.

Figure 1:
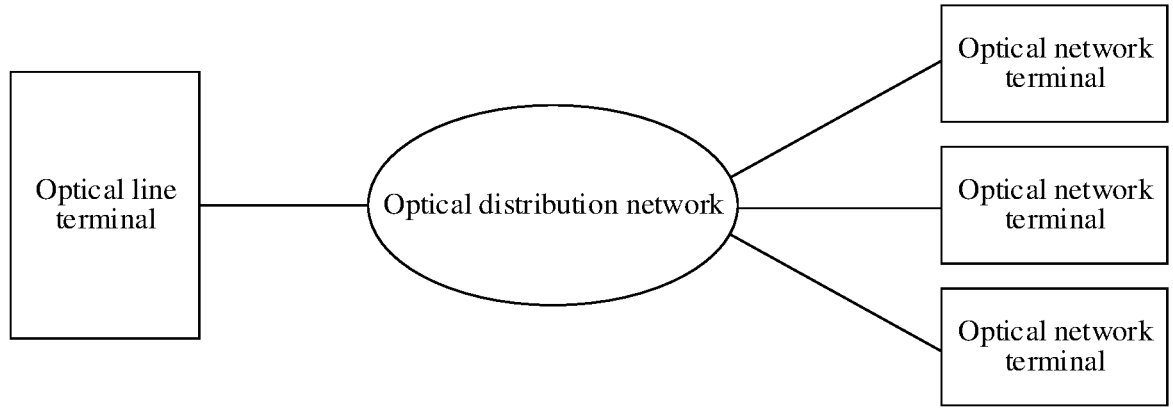
FIG. 1 is a schematic diagram of a structure of a PON according to an example of an embodiment of this application.

A PON is a passive optical network. As shown in FIG. 1, the PON includes three parts: an OLT, an ODN, and an ONT. The ODN is generally divided into four parts: a splitter, a feeder fiber, a distribution fiber, and a branch fiber. The feeder fiber refers to an optical fiber between the OLT and the ODN. The distribution fiber refers to an optical fiber between various levels of splitters. The branch fiber refers to an optical fiber between the splitter and the ONT. The ONT in embodiments of this application may alternatively be replaced with an optical network unit (optical network unit, ONU).

In a related technology, manually recording a port of a splitter connected to an ONT causes a long period of time spent in distinguishing the port connected to the ONT in the splitter. Therefore, this application provides a port identification method, to efficiently identify a port connected to an ONT in a splitter. The PON used in the method includes at least one level of splitter and at least one ONT. The ONT is connected to a port of the at least one level of splitter through an optical fiber. Different ONTs are connected to different ports of the at least one level of splitter.

Figure 2:
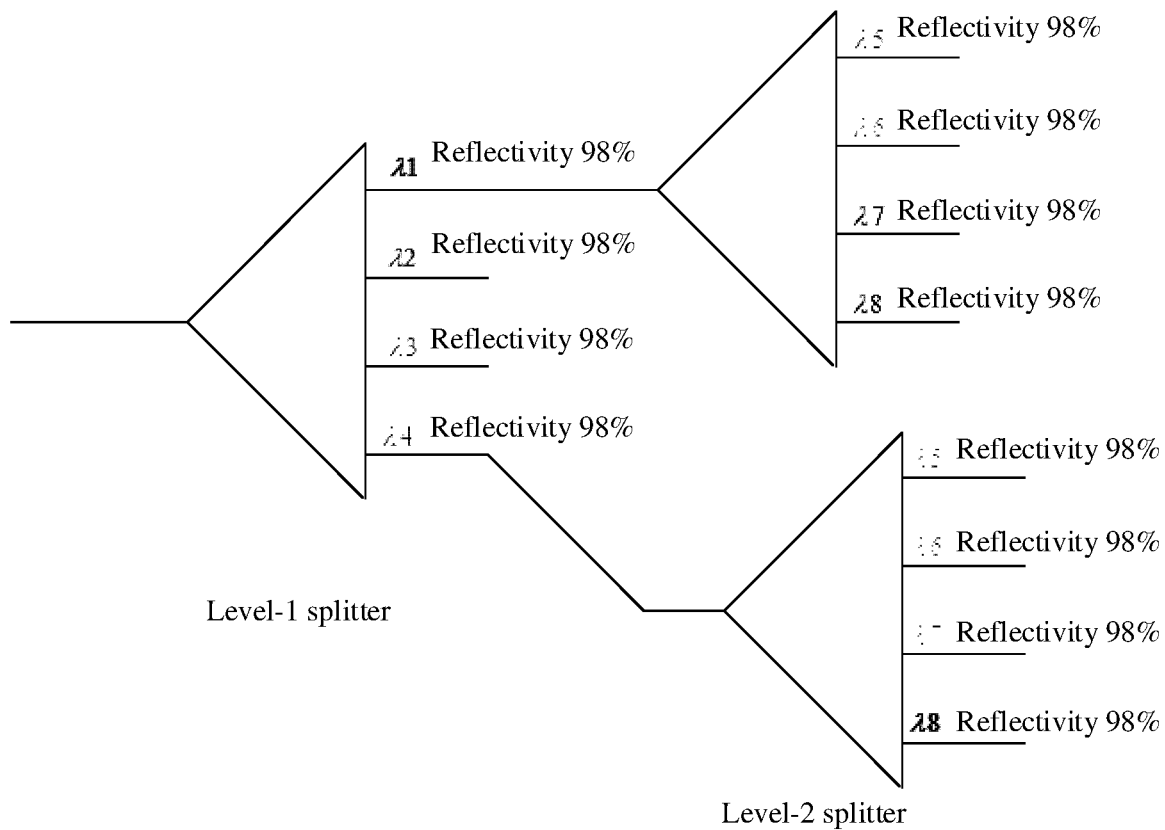
FIG. 2 is a schematic diagram of a structure of two levels of splitters according to an example of an embodiment of this application.

Reflection components are disposed on the ports of the at least one level of splitter. Wavelengths of test light reflected by reflection components disposed on different ports of a same splitter are different. Wavelengths of test light reflected by reflection components of ports of different levels of splitters are different. For example, as shown in FIG. 2, the at least one level of splitter is two levels of splitters. A level-1 splitter has one 1*4 splitter, and wavelengths of test light reflected by reflection components disposed on four ports are respectively $\lambda 1$, $\lambda 2$, $\lambda 3$, and $\lambda 4$. A level-2 splitter has four 1*4 splitters, and wavelengths of test light reflected by reflection components disposed on ports of each splitter in the level-2 splitter are different from those of the level-1 splitter. The wavelengths of the test light reflected by the reflection components disposed on the four ports of each splitter in the level-2 splitter are respectively $\lambda 5$, $\lambda 6$, $\lambda 7$, and $\lambda 8$. Certainly, the test light reflected by reflection components disposed on the ports of each splitter in the level-2 splitter may alternatively be different. A reflectivity of the reflection component disposed on each port is greater than or equal to a preset value, and the preset value is generally large. For example, the preset value is 99% or 98%.

Figure 3:
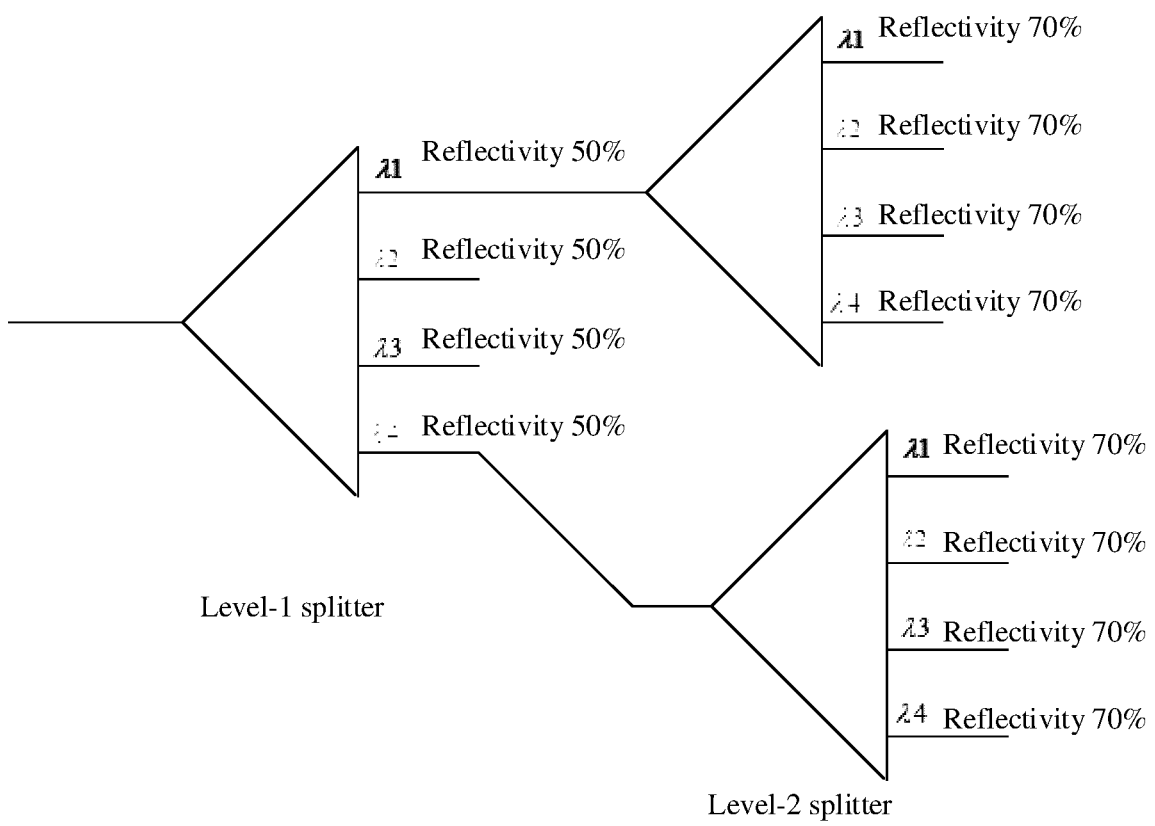
FIG. 3 is a schematic diagram of a structure of two levels of splitters according to an example of an embodiment of this application.

Alternatively, the at least one level of splitter is an even splitter. Reflection components are disposed on the ports of the at least one level of splitter. Wavelengths of test light reflected by reflection components disposed on different ports of a same splitter are different. Wavelengths of test light reflected by reflection components of ports of different levels of splitters are the same. For test light of a same wavelength, a reflectivity of a reflection component that reflects the test light in a splitter at each level is different, and a reflectivity of a reflection component of a port of a splitter with a smaller level number is lower. For example, as shown in FIG. 3, the at least one level of splitter is two levels of splitters, and each of the two levels of splitters is an even splitter. A level-1 splitter has one 1*4 splitter, and wavelengths of test light reflected by reflection components disposed on four ports are respectively $\lambda 1$, $\lambda 2$, $\lambda 3$, and $\lambda 4$. A level-2 splitter has four 1*4 splitters, and wavelengths of test light reflected by reflection components disposed on ports of each splitter in the level-2 splitter are the same as those of the level-1 splitter. The wavelengths of the test light reflected by the reflection components disposed on the four ports of each splitter in the level-2 splitter are respectively $\lambda 1$, $\lambda 2$, $\lambda 3$, and $\lambda 4$. A reflectivity of a reflection component that reflects test light of $\lambda\lambda 1$ in the level-1 splitter is 50%, and a reflectivity of a reflection component that reflects the test light of $\lambda 1$ in the level-2 splitter is 70%. A reflectivity of a reflection component that reflects test light of $\lambda 2$ in the level-1 splitter is 50%, and a reflectivity of a reflection component that reflects the test light of $\lambda 2$ in the level-2 splitter is 70%. A reflectivity of a reflection component that reflects test light of $\lambda 3$ in the level-1 splitter is 50%, and a reflectivity of a reflection component that reflects the test light of $\lambda 3$ in the level-2 splitter is 70%. A reflectivity of a reflection component that reflects test light of $\lambda 4$ in the level-1 splitter is 50%, and a reflectivity of a reflection component that reflects the test light of $\lambda 4$ in the level-2 splitter is 70%.

Figure 4:
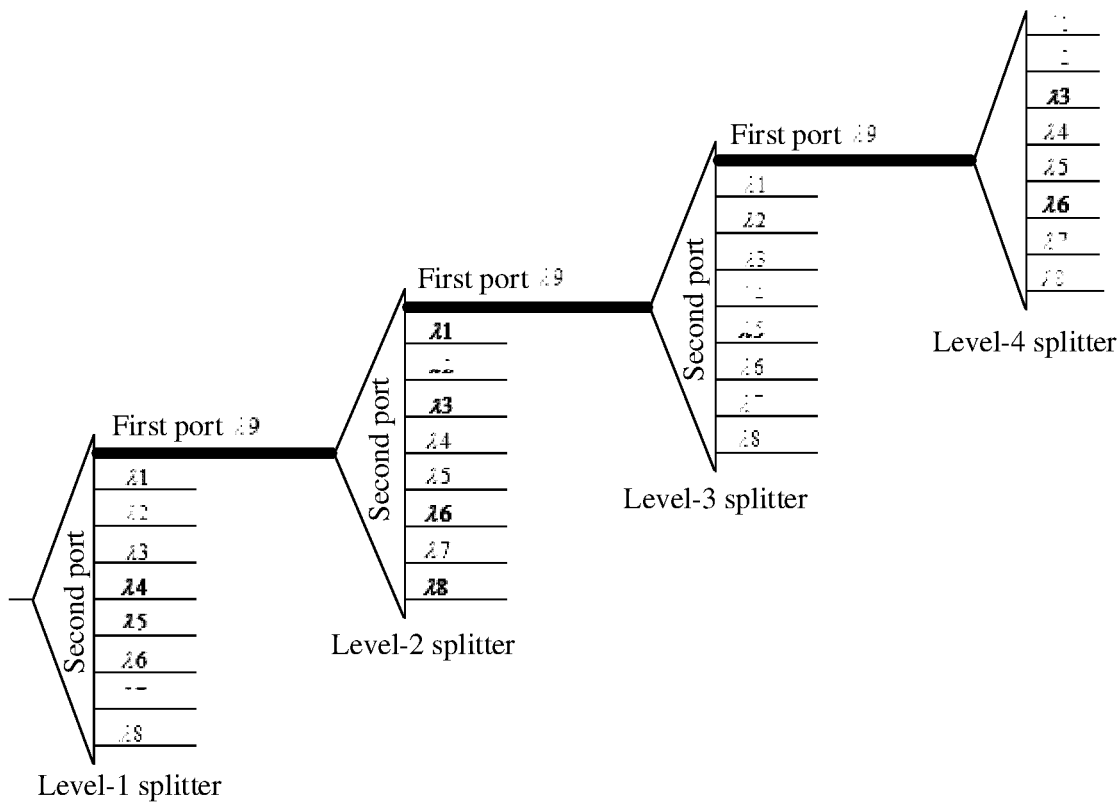
FIG. 4 is a schematic diagram of a structure of two levels of splitters according to an example of an embodiment of this application.

Alternatively, the at least one level of splitter is an uneven splitter. Reflection components are disposed on the ports of the at least one level of splitter. Wavelengths of test light reflected by reflection components disposed on different ports of a same splitter are different. Wavelengths of test light reflected by reflection components of ports of different levels of splitters are the same. For example, as shown in FIG. 4, the at least one level of splitter is four levels of splitters. A level-1 splitter has one 1*9 splitter, a level-2 splitter has one 1*9 splitter, a level-3 splitter has one 1*9 splitter, and a level-4 splitter has one 1*8 splitter. The level-1 splitter, the level-2 splitter, and the level-3 splitter are uneven splitters, and the level-4 splitter is an even splitter. Nine ports of each of the level-1 splitter, the level-2 splitter, and the level-3 splitter include one first port and eight second ports. The first port is a port connected to a next-level splitter, and the second port is a port connected to an ONT. A split ratio of the first port to the eight second ports is 7:3. The eight second ports are outputs of an even splitter (for example, it is assumed that a quantity of light entering a splitter at each level is 1, optical splitting of the first port is $7/10$, total optical splitting of the eight second ports is $3/10$, and optical splitting of each of the eight second ports is $3/80$). Eight ports of the level-4 splitter are second ports. A reflection component that reflects test light of $\lambda 9$ is disposed on the first port, and reflection components that respectively reflect test light of $\lambda 11$ to $\lambda 8$ are disposed on the eight second ports.

Optionally, the reflection component disposed on each port may be a reflection grating. For example, the reflection component may be a reflection grating implemented by using an optical waveguide. Certainly, the reflection component disposed on each port may alternatively be another component configured to reflect test light.

Figure 5:
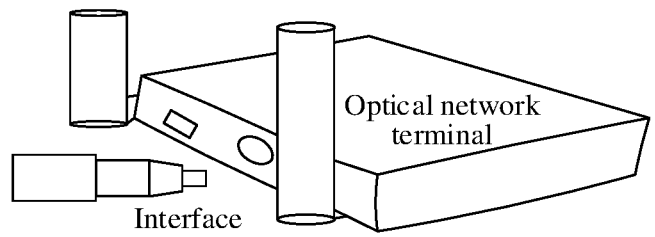
FIG. 5 is a schematic diagram of an ONT according to an example of an embodiment of this application.
Figure 6:
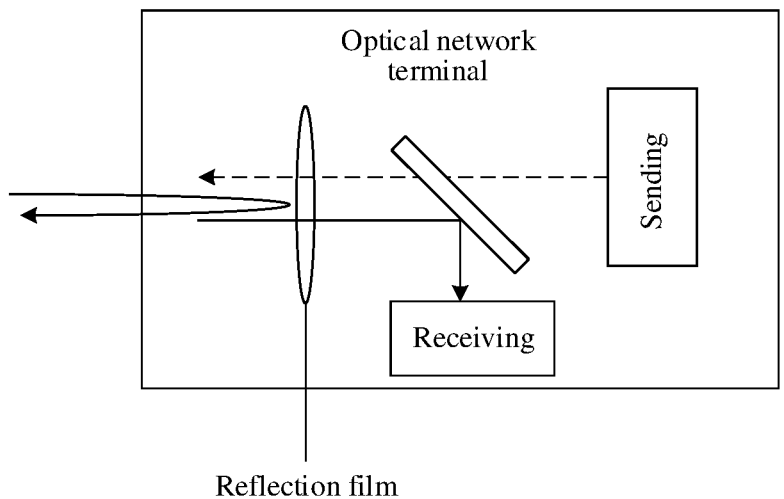
FIG. 6 is a schematic diagram of an ONT according to an example of an embodiment of this application.
Figure 7:
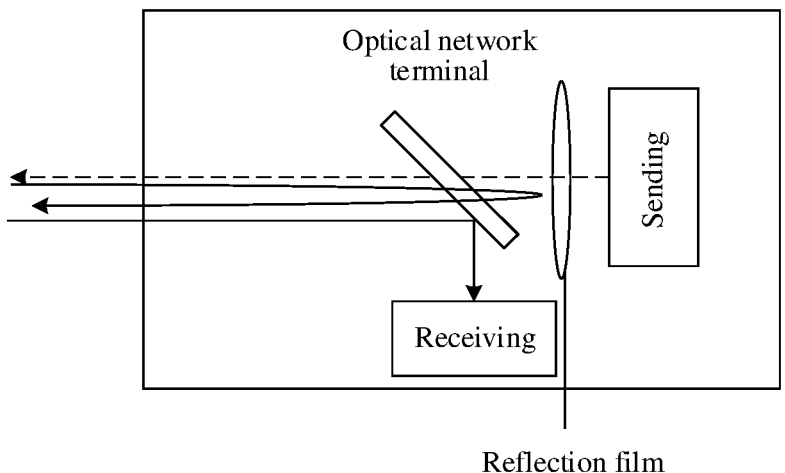
FIG. 7 is a schematic diagram of an ONT according to an example of an embodiment of this application.
Figure 8:
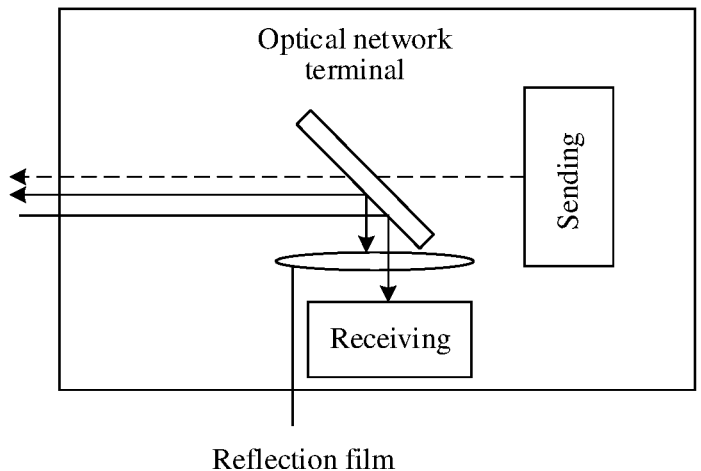
FIG. 8 is a schematic diagram of an ONT according to an example of an embodiment of this application.

All ONTs in embodiments of this application may reflect test light of various wavelengths. Optionally, there are three implementations of the ONT. In a first implementation, as shown in FIG. 5, a reflection component is disposed on an interface on which an optical fiber is connected to the ONT, and the reflection component may reflect all test light mentioned in this embodiment of this application. For example, the reflection component may reflect light within a band range that exactly includes various test light but does not include any service light. The service light includes uplink service light and downlink service light. In the first implementation, during deployment, the reflection component may be manually added onsite. In a second implementation, a reflection component that reflects test light is disposed inside the ONT. For example, the reflection component is a reflection film. FIG. 6 shows a structure of the reflection film inside the ONT. The reflection film is disposed at a location at which light enters the ONT. A dashed line with an arrow indicates uplink service light. A solid line with an arrow indicates downlink service light. A solid curve with an arrow indicates that the test light is reflected by the reflection film. FIG. 7 shows a structure of the reflection film inside the ONT. The reflection film is disposed in front of a component that sends uplink service light. A dashed line with an arrow indicates the uplink service light. A solid line with an arrow indicates downlink service light. A solid curve with an arrow indicates that the test light is reflected by the reflection film. FIG. 8 shows a structure of the reflection film inside the ONT. The reflection film is disposed in front of a component that receives downlink service light. A dashed line with a single arrow indicates uplink service light. A solid line with a single arrow indicates the downlink service light. A solid curve with double arrows indicates that the test light is reflected by the reflection film. In a third implementation, reflection in a natural end face is formed at an interface on which an optical fiber is connected to the ONT. The natural end face may be used to reflect various test light, and the ONT does not need to be changed.

It should be noted that when target test light mentioned subsequently exists, the foregoing mentioned reflection film further reflects the target test light, and a reflectivity of the target test light may be high, such as, 98%.

In addition, the PON further includes a wavelength-tunable device. The wavelength-tunable device is a part of an OLT, or may be deployed independently. However, an absolute value of a difference between a transmission distance between the wavelength-tunable device and the ONT and a transmission distance between the ONT and the OLT is less than a specific value. In this embodiment of this application, the wavelength-tunable device may be a wavelength-tunable optical time domain reflectometer (OTDR). On a basis of an original OTDR, the wavelength-tunable OTDR enables the OTDR to emit test light of a plurality of wavelengths. The plurality of wavelengths include wavelengths of test light that can be reflected by the reflection components disposed on the ports of the at least one level of splitter. After the wavelength-tunable OTDR emits the test light, the test light may be reflected by the reflection component disposed on the port of the at least one level of splitter or reflected by the ONT (a principle of reflection by the ONT is described later), and then may return to the wavelength-tunable OTDR. The wavelength-tunable OTDR may record receive power and receiving time. Optionally, the plurality of wavelengths further include a wavelength of the target test light. The target test light is not reflected by the reflection components disposed on the ports of the at least one level of splitter.

Figure 9:
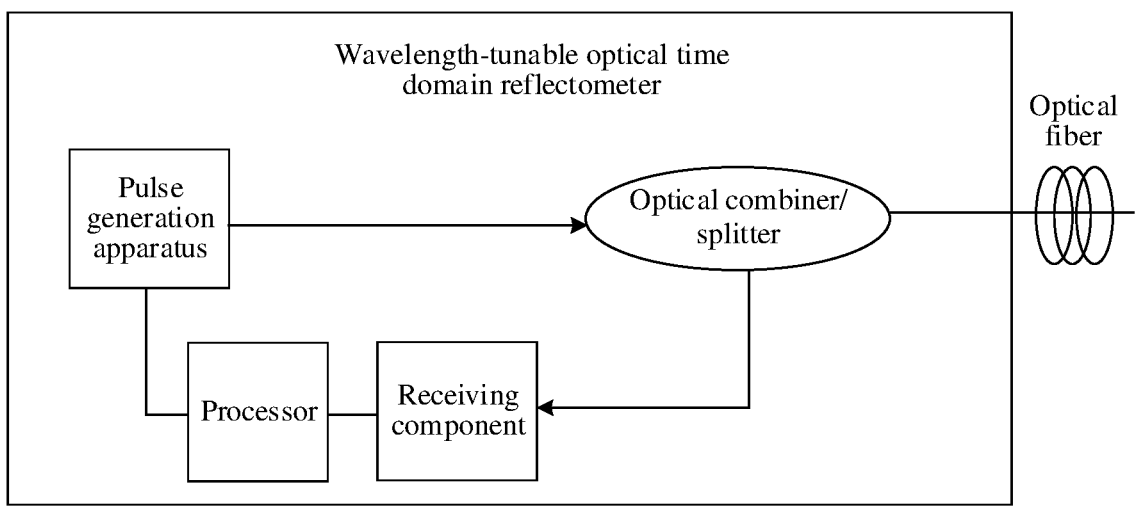
FIG. 9 is a schematic diagram of a structure of a wavelength-tunable device according to an example of an embodiment of this application.

FIG. 9 further provides a schematic diagram of a wavelength-tunable OTDR, including a pulse generation apparatus, an optical combiner/splitter (such as a coupler) or a circulator, a receiving component, a processor, and the like. The pulse generation apparatus is configured to output test light of a plurality of wavelengths, the test light of the plurality of wavelengths is pulse light, the optical combiner/splitter or the circulator is configured to transmit and receive test light, the receiving component is configured to detect receive power, the processor is configured to record receiving time, or the like. Only some devices are shown in FIG. 9. Optionally, the pulse generation apparatus may include a wavelength-tunable laser and a pulse generation component, or the pulse generation apparatus may be a wavelength-tunable pulse generation device.

It should be noted herein that if both the service light and the test light exist, a device configured to combine the service light and the test light, such as a wavelength division multiplexer, may be further disposed between the tunable OTDR and an ODN. In this case, when the service light is transmitted between the OLT and the ODN, the service light also passes through the device.

An execution body of the port identification method is described as follows. The execution body of the port identification method may be a port identification apparatus, and the port identification apparatus may be a hardware device or a software apparatus. When the port identification apparatus is the hardware device, the port identification apparatus may be referred to as a port identification device. The port identification apparatus may be a management device of an OLT or a PON, or may be an independent external device, such as a server. When the port identification apparatus may be the OLT, the port identification method may be performed by a board in the OLT. When the port identification apparatus is the software apparatus, the port identification apparatus may be a software module deployed in an ONT, or may be a software module deployed in a management device of a PON.

Figure 10:
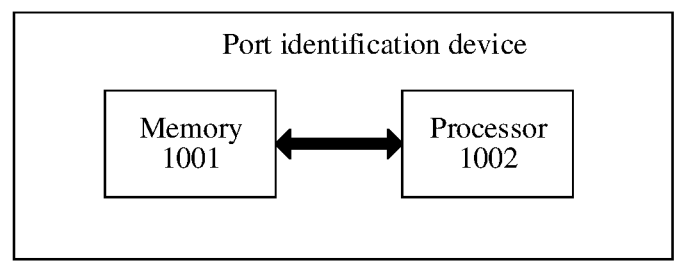
FIG. 10 is a schematic diagram of a structure of a port identification device according to an example of an embodiment of this application.

As shown in FIG. 10, when the port identification apparatus is the port identification device, the port identification device includes a memory 1001 and a processor 1002. The memory 1001 may be a read-only memory (ROM), a static storage device, a dynamic storage device, or the like. The memory 1001 may store computer instructions. When the computer instructions stored in the memory 1001 are executed by the processor 1002, the processor 1002 is configured to perform the port identification method. The memory may further store data used when the port identification method is performed. A general-purpose central processing unit (CPU), a graphics processing unit (GPU), or any combination thereof may be used as the processor 1002. The processor 1002 may include one or more chips. Optionally, the port identification device may further include a receiver, a transmitter, and the like.

Figure 11:
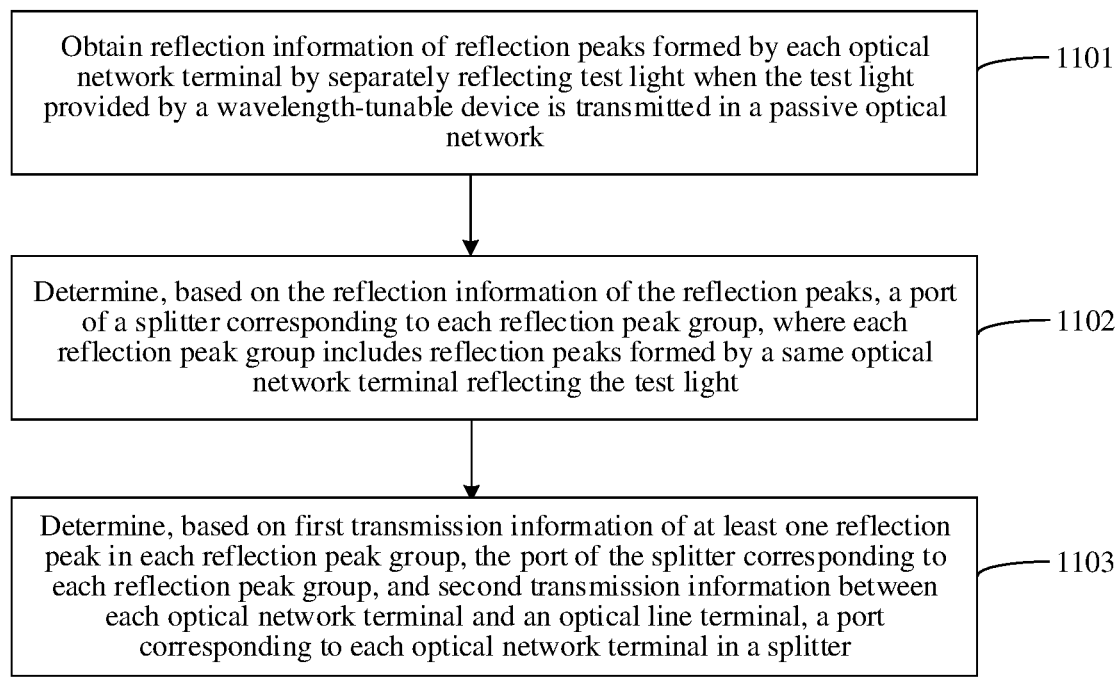
FIG. 11 is a schematic flowchart of a port identification method according to an example of an embodiment of this application.

The following describes a port identification method according to an embodiment of this application with reference to FIG. 11. The method may be performed by a port identification device. As shown in FIG. 11, a processing procedure of the method is as follows.

Step 1101. Obtain reflection information of reflection peaks formed by each ONT by separately reflecting test light when the test light provided by a wavelength-tunable device is transmitted in a PON.

In this embodiment, the port identification device receives the reflection information of the reflection peaks formed by each ONT by separately reflecting the test light provided by a wavelength-tunable device. The reflection information includes a location and a height. Because a location of the ONT is fixed, locations of reflection peaks formed by an ONT by reflecting the test light are also the same. Reflection peaks that are at a same location or close locations and that correspond to different test light are determined as reflection peaks formed by the ONT by separately reflecting the test light. Alternatively, the reflection information includes time information and a height. Time information of any reflection peak is duration used by the wavelength-tunable device to transmit test light corresponding to the reflection peak to an ONT corresponding to the reflection peak. Because a location of the ONT is fixed, time information of reflection peaks formed by an ONT by reflecting the test light is also the same or similar. Reflection peaks that are of same time information or similar time information and that correspond to different test light are determined as reflection peaks formed by the ONT by separately reflecting the test light.

Optionally, a process in which the wavelength-tunable device obtains the reflection information of the reflection peak is as follows.

The port identification device may send a test command to the wavelength-tunable device. The test command includes wavelengths of various test light and indicates an emitting sequence of the test light. Alternatively, the test command includes wavelengths of various test light. Alternatively, the test command does not carry information such as wavelengths of the test light.

After receiving the test command, the wavelength-tunable device may emit the test light outward based on the wavelengths of the test light and the emitting sequence of the test light that are included in the test command, may emit the test light outward based on the wavelengths of the test light included in the test command and a pre-stored emitting sequence of the test light, or may emit the test light outward based on pre-stored wavelengths of the test light and an emitting sequence of the test light. When the wavelength-tunable device emits the test light outward, emission time is recorded.

After the wavelength-tunable device emits the test light outward, a beam of test light is transmitted in the PON. If a wavelength of the test light is equal to a wavelength of test light reflected by a reflection component disposed on a port of a splitter, the reflection component of the port reflects the test light, and an ONT connected to the port receives only a small part of the test light. Then, the ONT connected to the port reflects the small part of the test light. The reflected test light enters the wavelength-tunable device. The wavelength-tunable device may determine receiving time and receive power. If a wavelength of the test light is not equal to a wavelength of test light reflected by a reflection component disposed on a port of a splitter, the reflection component of the port does not reflect the test light, and an ONT connected to the port basically receives most of the test light. Then, the ONT connected to the port reflects the most of the test light. The reflected test light enters the wavelength-tunable device. The wavelength-tunable device may determine receiving time and receive power.

For a beam of test light, the wavelength-tunable device uses the following formula (1) to calculate a location of a reflection peak corresponding to the test light:

$$L = \frac{c}{n} * \left(\frac{\Delta t}{2}\right)_{L=\frac{c}{n}*\left(\frac{\Delta t}{2}\right)} \quad (1)$$

In formula (1), L is a distance from the wavelength-tunable device to an ONT, c is a speed of light in vacuum, n is a fiber group index of refraction, $$\frac{c}{n}$$

is a transmission speed in an optical fiber, and $\Delta t$ is a difference between receiving time and sending time. L represents a location of a reflection peak.

A height of the reflection peak represents receive power of the test light received by the wavelength-tunable device.

Time information of the reflection peak is equal to ½ multiplied by (receiving time−sending time).

Through the foregoing method, the wavelength-tunable device may generate the reflection information of the reflection peaks formed by each ONT by separately reflecting the test light when the test light is transmitted in the PON, and may further generate reflection information of the reflection peak formed by the reflection component of the port of the splitter by reflecting the test light. Then, the wavelength-tunable device may send the reflection information of the reflection peak to the port identification device. Optionally, when the reflection information is sent, wavelength information of the corresponding test light is sent together, so that the port identification device may determine specific test light corresponding to the reflection peak.

Certainly, when the reflection information includes the location and the height, the wavelength-tunable device may alternatively send an OTDR curve to the port identification device, and a location and a height of a reflection peak formed by each type of test light are recorded on the OTDR curve. Certainly, the wavelength-tunable device may send a location and a height of a reflection peak formed by only one type of test light to the port identification device every time, or may send locations and heights of reflection peaks formed by all test light together. Certainly, the wavelength-tunable device may reflect the reflection information of the reflection peak to a storage device, and the port identification device obtains the reflection information from the storage device.

It should be noted herein that transmit power of the test light emitted by the wavelength-tunable device may be the same. Certainly, transmit power of the test light emitted by the wavelength-tunable device may alternatively be different. When the transmit power of the test light is different, reflection peaks corresponding to the test light may be converted into reflection peaks under the same transmit power by using the transmit power of the test light.

It should be further noted herein that when the reflection information of the reflection peak sent by the wavelength-tunable device includes the reflection information of the reflection peak formed by the reflection component of the port by reflecting the test light, the port identification device may filter out reflection information of a reflection peak that does not belong to any reflection peak group, and the reflection information of the reflection peaks formed by each ONT by separately reflecting the test light remains.

Step 1102. Determine, based on the reflection information of the reflection peaks, a port of a splitter corresponding to each reflection peak group, where each reflection peak group includes reflection peaks formed by a same ONT by reflecting the test light.

Each reflection peak group includes the reflection peaks formed by the same ONT by reflecting the test light. Different reflection peak groups correspond to different ONTs. When at least one level of splitter is a plurality of levels of splitters, a port of a splitter corresponding to a reflection peak group is for describing a port of a level-n splitter connected to an ONT to which the reflection peak group belongs, and a port between the level-n splitter and a level-1 splitter. When at least one level of splitter is one level of splitter, a port of a splitter corresponding to a reflection peak group is for describing a port of a splitter directly connected to an ONT to which the reflection peak group belongs.

In this embodiment, step 1102 has a plurality of implementations, and two feasible implementations are provided as follows.

Implementation 1: The port of the splitter corresponding to each reflection peak group is determined based on the locations and the heights of the reflection peaks.

In this embodiment, the port identification device may use the locations and the heights of the reflection peaks formed by each ONT by separately reflecting the test light, to regard, in the reflection peaks corresponding to different test light, reflection peaks whose locations are the same or whose location difference is less than a specific value (the value is small) as reflection peaks formed by an ONT by reflecting the test light. That is, a reflection peak group is formed. Then, the port identification device determines, based on the height of the reflection peak in each reflection peak group, the port of the splitter corresponding to each reflection peak group.

Implementation 2: The port of the splitter corresponding to each reflection peak group is determined based on the time information and the heights of the reflection peaks, where time information of any reflection peak is duration used by the wavelength-tunable device to transmit test light corresponding to the reflection peak to an ONT corresponding to the reflection peak.

In this embodiment, the port identification device may use the time information of the reflection peaks formed by each ONT by separately reflecting the test light, to regard, in the reflection peaks corresponding to different test light, reflection peaks whose time information is the same or whose time information difference is less than a specific value (the value is small) as reflection peaks formed by an ONT by reflecting the test light. That is, a reflection peak group is formed. Alternatively, the port identification device determines the location of each reflection peak by multiplying the time information of each reflection peak by a transmission speed, and then regards, in the reflection peaks corresponding to different test light, reflection peaks whose locations are the same or whose location difference is less than a specific value (the value is small) as reflection peaks formed by an ONT by reflecting the test light. That is, a reflection peak group is formed.

Then, the port identification device determines, based on the height of the reflection peak in each reflection peak group, the port of the splitter corresponding to each reflection peak group.

Step 1103. Determine, based on first transmission information corresponding to at least one reflection peak in each reflection peak group, the port of the splitter corresponding to each reflection peak group, and second transmission information between each ONT and an OLT, a port corresponding to each ONT in a splitter.

In this embodiment, a relationship between the reflection peak and the port of the splitter is determined in step 1102, and a relationship between the ONT and the port of the splitter is determined in step 1103. Specifically, the port identification device may pre-store the second transmission information between the ONT and the OLT, or obtain the second transmission information from the ONT (described below). The port identification device determines, based on the first transmission information corresponding to the at least one reflection peak in each reflection peak group, the port of the splitter corresponding to each reflection peak group, and the second transmission information between each ONT and the OLT, the port corresponding to each ONT in the splitter.

The procedure shown in FIG. 11 is further described or supplemented separately below.

In a possible implementation, the test light emitted by the wavelength-tunable device further includes target test light. A wavelength of the target test light is different from wavelengths of test light reflected by reflection components of ports of the at least one level of splitter. To be specific, the target test light is not reflected by the reflection components of the ports of the at least one level of splitter, and most of the target test light reaches the ONT. When the test light further includes the target test light, processing in step 1102 may be as follows.

The port of the splitter corresponding to each reflection peak group is determined based on the locations and the heights of the reflection peaks and a location and a height of a reflection peak formed by the target test light.

In this embodiment, each reflection peak formed by the target test light is a reflection peak group. The port identification device may determine, by using the locations of the reflection peaks formed by the test light and the location of the reflection peak formed by the target test light, location differences between the reflection peaks formed by the test light and the reflection peak formed by the target test light. If a location difference between any reflection peak of the test light and a first reflection peak of the target test light is the smallest, the reflection peak is added to a reflection peak group to which the first reflection peak belongs. Then, the port identification device determines, based on the height of the reflection peak formed by the target test light, and a height of another reflection peak in each reflection peak group, the port of the splitter corresponding to each reflection peak group.

In a possible implementation, the test light emitted by the wavelength-tunable device further includes target test light. A wavelength of the target test light is different from wavelengths of test light reflected by reflection components of ports of the at least one level of splitter. To be specific, the target test light is not reflected by the reflection components of the ports of the at least one level of splitter, and most of the target test light reaches the ONT. When the test light further includes the target test light, processing in step 1102 may be as follows.

The port of the splitter corresponding to each reflection peak group is determined based on the time information and the heights of the reflection peaks, time information and a height of a reflection peak formed by the target test light. Time information of any reflection peak is duration used by the wavelength-tunable device to transmit test light corresponding to the reflection peak to an ONT corresponding to the reflection peak.

In this embodiment, each reflection peak formed by the target test light belongs to a different reflection peak group. The port identification device may determine, by using the time information of the reflection peaks formed by the test light and the time information of the reflection peak formed by the target test light, time information differences between the reflection peaks formed by the test light and the reflection peak formed by the target test light. If a time information difference between any reflection peak of the test light and a first reflection peak of the target test light is the smallest, the reflection peak is added to a reflection peak group to which the first reflection peak belongs. Then, the port identification device determines, based on the height of the reflection peak formed by the target test light, and a height of another reflection peak in each reflection peak group, the port of the splitter corresponding to each reflection peak group. In this way, because the reflection component disposed on the port of the splitter does not reflect the target test light, the reflection peak formed by the target test light may be used as a standard to quickly determine whether other test light is reflected, thereby improving efficiency of determining the port of the splitter corresponding to each reflection peak group.

In a possible implementation, the following describes a process of determining the port of the splitter corresponding to each reflection peak group by using an example in which the at least one level of splitter is an even splitter, and wavelengths of test light reflected by reflection components of ports of different levels of splitters are different.

The at least one level of splitter is the even splitter, the at least one level of splitter is n levels of splitters, and n is greater than or equal to 2. At least one ONT is connected to a level-n splitter. A reflection peak corresponding to a same level-i splitter in each reflection peak group, and a port of a level-(i−1) splitter connected to a level-i splitter are determined based on the location and the height of the reflection peak formed by the target test light and a location and a height of a reflection peak formed by test light of the level-(i−1) splitter in the test light. The test light of the level-(i−1) splitter is test light reflected by a reflection component of the port of the level-(i−1) splitter, and i is greater than 1 and less than or equal to n. A port of the level-n splitter corresponding to each reflection peak group is determined based on the location and the height of the reflection peak formed by the target test light and a location and a height of a reflection peak formed by test light of the level-n splitter in the test light. The test light of the level-n splitter is test light reflected by a reflection component of the port of the level-n splitter. The port of the splitter corresponding to each reflection peak group is determined based on the reflection peak corresponding to the same level-i splitter in each reflection peak group, the port of the level-(i−1) splitter connected to the level-i splitter, and the port of the level-n splitter corresponding to each reflection peak group.

In this embodiment, it is assumed that the at least one ONT is connected to the level-n splitter. For each reflection peak group, a height difference between the reflection peak formed by the target test light and the reflection peak formed by the test light of the level-(i−1) splitter is determined. Target reflection peaks whose height difference is greater than a target value in each reflection peak group are enabled to correspond to a same level-i splitter. A port at which a reflection component that reflects test light forming the target reflection peak is located is determined as the port of the level-(i−1) splitter connected to the level-i splitter. In this way, the reflection peak corresponding to the same level-i splitter in all reflection peak groups, and the port of the level-(i−1) splitter connected to the level-i splitter may be determined.

For a reflection peak group, a height difference between the reflection peak formed by the target test light and the reflection peak formed by the test light of the level-n splitter is determined. A reflection peak whose height difference is greater than a target value is determined. A port at which a reflection component that reflects test light forming the reflection peak is located is determined as the port of the level-n splitter corresponding to the reflection peak group. To be specific, an ONT to which the reflection peak group belongs is connected to the port of the level-n splitter.

Then, the port identification device may determine a connection relationship between the level-i splitter and the level-(i−1) splitter corresponding to each reflection peak group by using the reflection peak corresponding to the same level-i splitter, and the port of the level-(i−1) splitter connected to the level-i splitter. In addition, based on the port of the level-n splitter corresponding to each reflection peak group, and the connection relationship between the level-i splitter and the level-(i−1) splitter corresponding to each reflection peak group, the port of the splitter corresponding to each reflection peak group may be determined.

Figure 12:
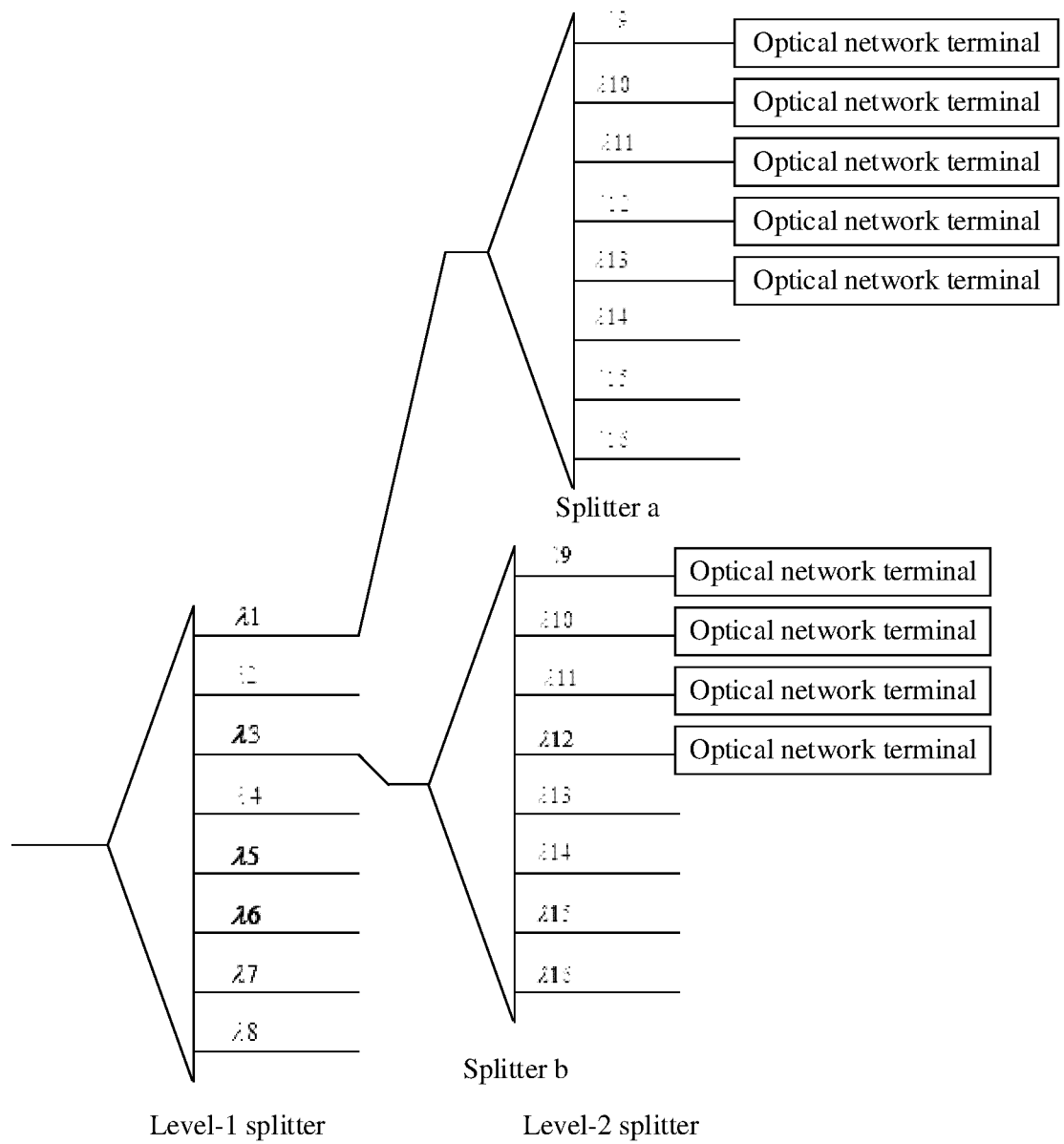
FIG. 12 is a schematic diagram of a structure of two levels of even splitters according to an example of an embodiment of this application.

For example, as shown in FIG. 12, the at least one level of splitter is two levels of splitters, and a value of n is 2. A level-1 splitter has one 1*8 splitter, a level-2 splitter has two 1*8 splitters (a splitter a and a splitter b). The level-1 splitter and the level-2 splitter are even splitters. Reflection components that respectively reflect test light whose wavelengths are λ1 to λ8 are disposed on eight ports (a port 1 to a port 8) of the level-1 splitter, and the port 1 to the port 8 respectively correspond to λ1 to λ8. Reflection components that respectively reflect test light whose wavelengths are λ9 to λ16 are disposed on eight ports (a port 1 to a port 8) of each splitter of the level-2 splitter, and the port 1 to the port 8 respectively correspond to λ9 to λ16. The wavelength of the target test light is λ0. The two 1*8 splitters of the level-2 splitter are respectively connected to the port 1 and the port 3 of the level-1 splitter. The port 1 to the port 5 of the splitter a are respectively connected to ONTs, a distance between the ONTs connected to the port 1 to the port 5 and an OLT gradually increases. The port 1 to the port 4 of the splitter b are respectively connected to ONTs, and a distance between the ONTs connected to the port 1 to the port 4 and the OLT gradually increases. Each ONT reflects all test light. The level-i splitter and the level-n splitter are level-2 splitters, and the level-(i−1) splitter is a level-1 splitter.

Figure 13:
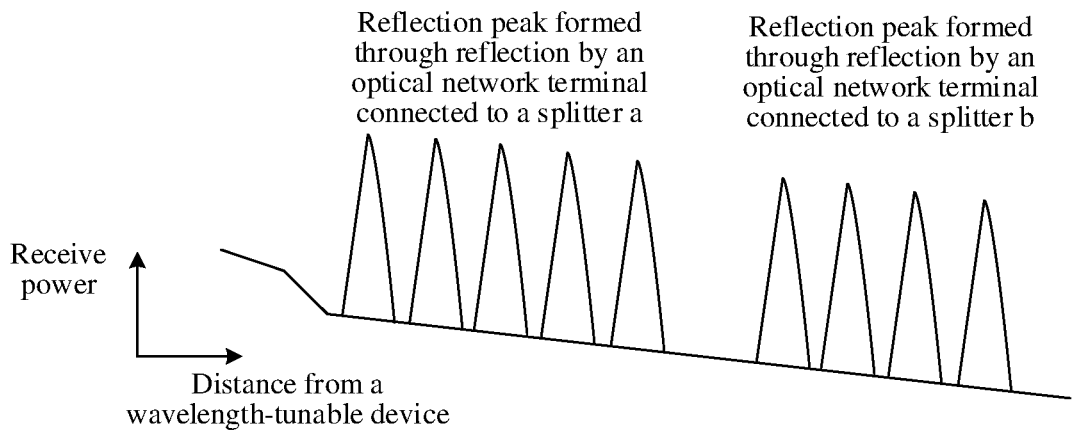
FIG. 13 is a schematic diagram of reflection peaks formed by different ONTs according to an example of an embodiment of this application.

As shown in FIG. 13, the wavelength-tunable device emits the test light of λ0. Because the reflection components of the ports of various levels of splitters do not reflect the test light of λ0, all reflection peaks are generated by the ONT, and nine reflection peaks are generated.

Figure 14:
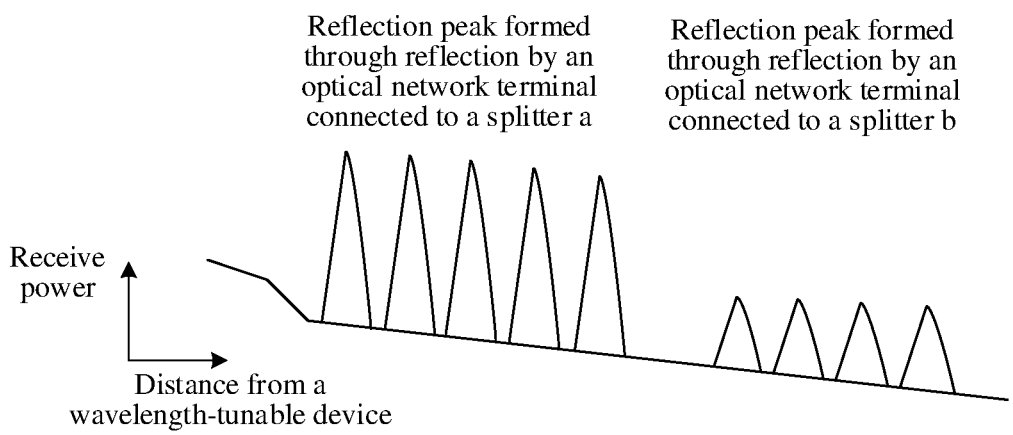
FIG. 14 is a schematic diagram of reflection peaks formed by different ONTs according to an example of an embodiment of this application.

As shown in FIG. 14, the wavelength-tunable device emits test light of λn(n∈1□8) λn(n∈1~8) Because the test light of λn is reflected by a reflection component of a port n of the level-1 splitter, receive power of the test light of λn received by an ONT that is in the level-2 splitter and that is connected to the port n of the level-1 splitter decreases, so that a height of a reflection peak formed by the ONT in the level-2 splitter by reflecting the test light of λn decreases. FIG. 14 shows a case in which λn is λ3. In this way, with reference to FIG. 13 and FIG. 14, it may be obtained that the splitter b of the level-2 splitter is connected to the port 3 of the level-1 splitter, and there are four reflection peaks corresponding to the splitter b.

Figure 15:
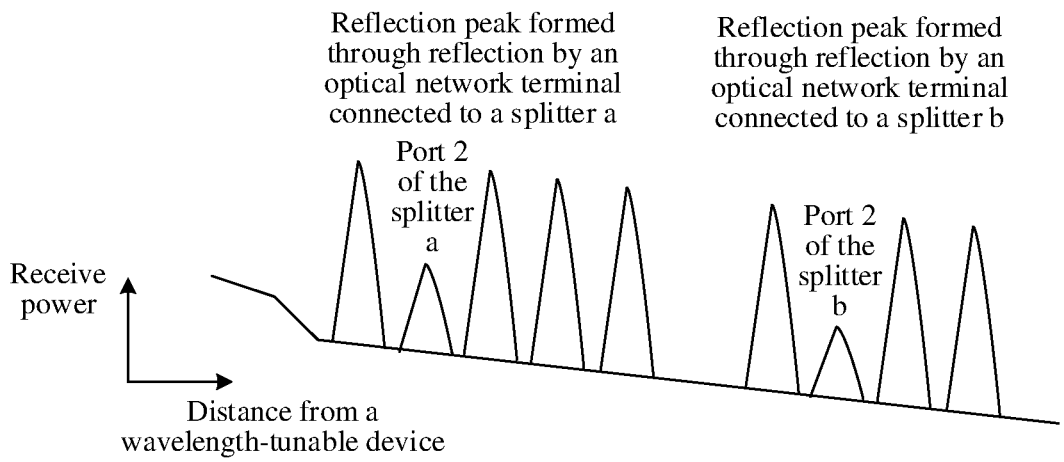
FIG. 15 is a schematic diagram of reflection peaks formed by different ONTs according to an example of an embodiment of this application.

As shown in FIG. 15, the wavelength-tunable device emits test light of λm (m∈9□16). Because the test light of λm is reflected by a reflection component of a port m of the level-2 splitter, receive power of the test light of λm received by an ONT connected to the port m of the level-2 splitter decreases, so that a height of a reflection peak formed by the ONT connected to the port m of the level-2 splitter by reflecting the test light of λm decreases. FIG. 15 shows a case in which λm is λ10. In this way, with reference to FIG. 13 and FIG. 15, it may be obtained that an ONT connected to the port 2 of the level-2 splitter reflects the test light of λ10. In this way, it may be obtained that a reflection peak group formed through reflection by the ONT connected to the port 2 of the splitter b corresponds to the port 2 of the splitter b, and corresponds to the port 3 of the level-1 splitter.

It should be noted that, in FIG. 13 to FIG. 15, a reason why a reference point in a height direction of each reflection peak is different is that transmission distances between the ONTs and the wavelength-tunable device are different, and optical fiber losses are also different. A larger transmission distance indicates a larger optical fiber loss. This causes a lower reference point. In addition, in FIG. 13 to FIG. 15, from left to right respectively, the $1^{st}$ reflection peak in FIG. 13, the $1^{st}$ reflection peak in FIG. 14, and the $1^{st}$ reflection peak in FIG. 15 form a reflection peak group; the $2^{nd}$ reflection peak in FIG. 13, the $2^{nd}$ reflection peak in FIG. 14, and the $2^{nd}$ reflection peak in FIG. 15 form a reflection peak group; and the like.

It should be further noted that, a principle of determining the port of the splitter corresponding to the reflection peak group in the foregoing process is as follows. Test light is not reflected by the reflection component of the port of the splitter, and most of the test light reaches the ONT connected to the port. Therefore, power of the test light reflected back to the wavelength-tunable device is high, and the height of the formed reflection peak is high. The test light is reflected by the reflection component of the port of the splitter, and a small part of the test light reaches the ONT connected to the port. Therefore, the power of the test light reflected back to the wavelength-tunable device is low, and the height of the formed reflection peak is low. Therefore, the port of the splitter corresponding to the reflection peak group may be determined based on the height of the reflection peak.

In a possible implementation, the at least one level of splitter is an even splitter. A splitter at each level is a 1*m splitter, and m is greater than or equal to 2. Wavelengths of test light reflected by reflection components of ports of different levels of splitters are the same. The following describes a process of determining the port of the splitter corresponding to each reflection peak group.

The reflection peak group is determined based on the locations of the reflection peaks formed by the test light and the location of the reflection peak formed by the target test light. For a reflection peak group j, a port of a splitter corresponding to the reflection peak group j is determined based on differences between the height of the reflection peak formed by the target test light and the heights of the reflection peaks formed by the test light in the reflection peak group j. The reflection peak group j is any reflection peak group.

In this embodiment, the port identification device may use the locations and the heights of the reflection peaks formed by each ONT by separately reflecting the test light, to regard, in the reflection peaks corresponding to different test light, reflection peaks whose locations are the same or whose location difference is less than a specific value as reflection peaks formed by an ONT by reflecting the test light. That is, a reflection peak group is formed. For each reflection peak group, the reflection peak group j is used for description. The port identification device obtains a difference between the height of the reflection peak formed by the target test light in the reflection peak group j and a height of another reflection peak. If a difference is greater than a first preset value, a reflection peak corresponding to the difference is determined, and a port on which a reflection component to which test light of the reflection peak belongs is disposed is determined. Then, the port is determined as the port of the splitter corresponding to the reflection peak group j. This is because the test light is reflected many times, and when the test light is reflected by the ONT, the power is low. After the test light is reflected by the ONT, the receive power received by the wavelength-tunable device is also low. In comparison with the reflection peak formed by the target test light, the height has a greatest decrease. If a difference is greater than a second preset value and is less than or equal to the first preset value, a port on which a reflection component to which test light of the reflection peak belongs is disposed is determined. Then, the port is determined as the port of the splitter corresponding to the reflection peak group j. There may be a plurality of differences that are all greater than the second preset value and less than or equal to the first preset value. In this case, the plurality of differences may be sorted in descending order, and a larger difference indicates a larger level number of a splitter in which a reflection component to which test light corresponding to the difference belongs is located. This is because the test light is reflected only by a reflection component of a port of a level of splitter, and a height of a reflection peak decreases in comparison with the reflection peak formed by the target test light. In addition, because a larger level number indicates a higher reflectivity of the reflection component, a larger level number indicates a greater decrease in the height of the reflection peak. The second preset value is less than the first preset value, and is stored in the port identification device.

For example, in FIG. 3, a reflection peak group 1 includes the reflection peak formed by the target test light, a reflection peak 1 corresponding to $\lambda 1$, a reflection peak 2 corresponding to $\lambda 2$, a reflection peak 3 corresponding to $\lambda 3$, and a reflection peak 4 corresponding to $\lambda 4$. A difference between the reflection peak formed by the target test light and the reflection peak 3 and a difference between the reflection peak formed by the target test light and the reflection peak 4 are less than or equal to the second preset value. A difference between the reflection peak formed by the target test light and the reflection peak 1 and a difference between the reflection peak formed by the target test light and the reflection peak 2 are greater than the second preset value and less than or equal to the first preset value. In addition, the difference between the reflection peak formed by the target test light and the reflection peak 1 is less than the difference between the reflection peak formed by the target test light and the reflection peak 2. This indicates that the $\lambda 1$ corresponding to the reflection peak 1 is the wavelength of the test light reflected by the reflection component of the port of the level-1 splitter, and the $\lambda 2$ corresponding to the reflection peak 2 is the wavelength of the test light reflected by the reflection component of the port of the level-2 splitter.

In a possible implementation, the at least one level of splitter is an uneven splitter. Wavelengths of test light reflected by reflection components of ports of different levels of splitters are the same. The following describes a process of determining the port of the splitter corresponding to each reflection peak group.

The at least one level of splitter is the uneven splitter, the at least one level of splitter is n levels of splitters, and n is greater than or equal to 2. A level number of the splitter corresponding to each reflection peak group is determined based on the location and the height of the reflection peak formed by the target test light and a location and a height of a reflection peak formed by test light corresponding to a first port of the at least one level of splitter. A port of a splitter that is directly connected to an ONT to which each reflection peak group belongs is determined based on the location and the height of the reflection peak formed by the target test light and a location and a height of a reflection peak formed by test light corresponding to a second port of the at least one level of splitter. The port of the splitter corresponding to each reflection peak group is determined based on the level number of the splitter corresponding to each reflection peak group and the port of the splitter that is directly connected to the ONT to which each reflection peak group belongs.

In this embodiment, the at least one level of splitter is the uneven splitter, the at least one level of splitter is the n levels of splitters, and n is greater than or equal to 2. A wavelength of test light reflected by a reflection component disposed on the first port of a splitter at each level is the same. A wavelength of test light reflected by a reflection component disposed on a second port of a splitter at each level is the same. Wavelengths of test light reflected by reflection components disposed on different second ports of splitters at a same level are different. The first port may be referred to as a backbone port, the second port may be referred to as a non-backbone port, and there are a plurality of second ports. For example, a value of n is 3. A reflection component that reflects test light of $\lambda 9$ is disposed on a first port of a level-1 splitter. There are eight second ports. Reflection components that respectively reflect test light of $\lambda 1$ to $\lambda 8$ are disposed on the eight second ports of a splitter at each level.

For a reflection peak group, a height difference between the reflection peak formed by the target test light and the reflection peak formed by the test light corresponding to the first port is determined. A value range to which the height difference belongs is determined, and a level number corresponding to the value range is determined as the level number of the reflection peak group. A smaller level number indicates a smaller endpoint value of the value range. For example, a value range corresponding to a first level is from 0 to a first value, a value range corresponding to a second level is from the first value to a second value, and a value range corresponding to a third level is from the second value to a third value. The first value is less than the second value, and the second value is less than the third value.

For a reflection peak group, a height difference between the reflection peak formed by the target test light and the reflection peak formed by the test light of the second port is determined. A reflection peak whose height difference is greater than a target value is determined. A port at which a reflection component that reflects test light forming the reflection peak is located is determined as the port of the splitter corresponding to the reflection peak group. Because the level number of the splitter corresponding to each reflection peak group is determined, and the port of the splitter that is directly connected to the ONT to which each reflection peak group belongs is determined, the port of the splitter corresponding to each reflection peak group may be determined.

Figure 16:
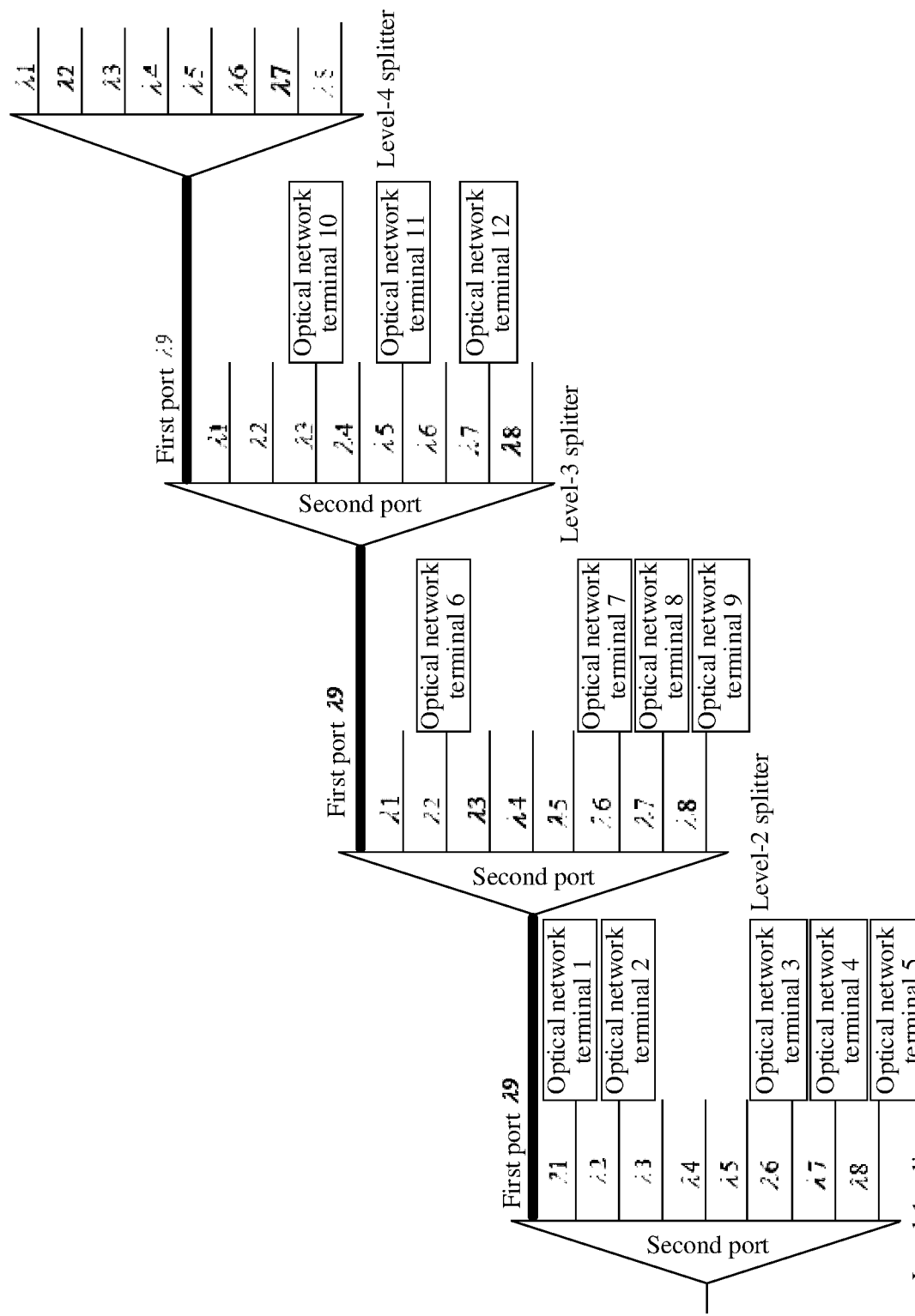
FIG. 16 is a schematic diagram of a structure of four levels of uneven splitters according to an example of an embodiment of this application.

For example, as shown in FIG. 16, the at least one level of splitter is four levels of splitters, and a value of n is 4. A level-1 splitter has one 1*9 splitter, a level-2 splitter has one 1*9 splitter, a level-3 splitter has one 1*9 splitter, and a level-4 splitter has one 1*8 splitter. The level-1 splitter, the level-2 splitter, and the level-3 splitter are uneven splitters, and the level-4 splitter is an even splitter. Nine ports of each of the level-1 splitter, the level-2 splitter, and the level-3 splitter respectively include one first port and eight second ports. A split ratio of the first port to the eight second ports is 7:3. The eight second ports are outputs of an even splitter (for example, it is assumed that a quantity of light entering a splitter at each level is 1, optical splitting of the first port is 7/10, total optical splitting of the eight second ports is 3/10, and optical splitting of each of the eight second ports is 3/80). Eight ports of the level-4 splitter are second ports. A reflection component that reflects test light of λ9 is disposed on the first port, and reflection components that respectively reflect test light of λ1 to λ8 are disposed on the eight second ports. The nine ports of each of the level-1 splitter to the level-3 splitter are respectively referred to as a port 1 to a port 9. The port 9 is a first port, and the port 1 to the port 8 are eight second ports. The port 1, the port 2, and the port 6 to the port 8 of the level-1 splitter are respectively connected to an ONT1 to an ONT5. The port 2, and the port 6 to the port 8 in the level-2 splitter are respectively connected to an ONT6 to an ONT9. The port 3, the port 5, and the port 7 in the level-3 splitter are respectively connected to an ONT10 to an ONT12. The port of the level-4 splitter is not connected to an ONT. The wavelength of the target test light is λ0.

Figure 17:
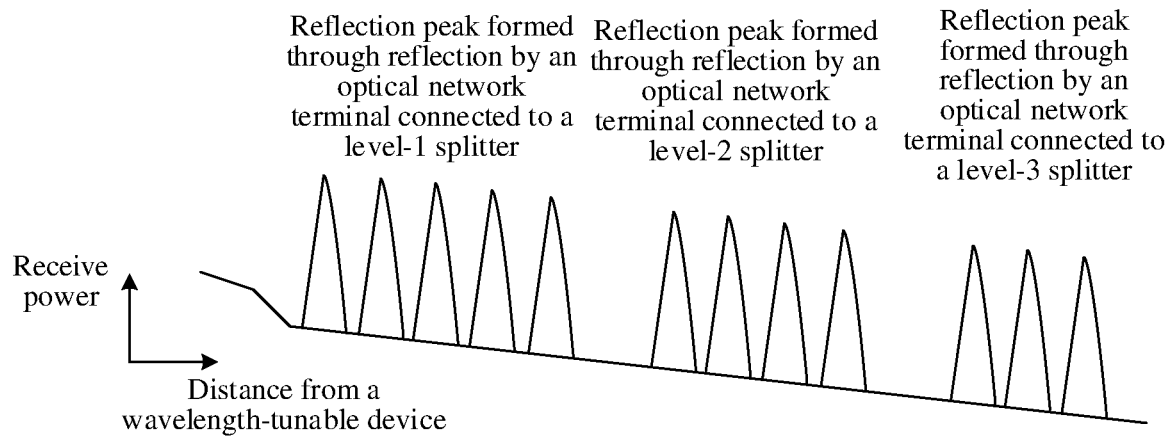
FIG. 17 is a schematic diagram of reflection peaks formed by different ONTs according to an example of an embodiment of this application.

As shown in FIG. 17, the wavelength-tunable device emits the test light of λ0. Because the reflection components of the ports of various levels of splitters do not reflect the test light of λ0, all reflection peaks are generated by the ONT.

Figure 18:
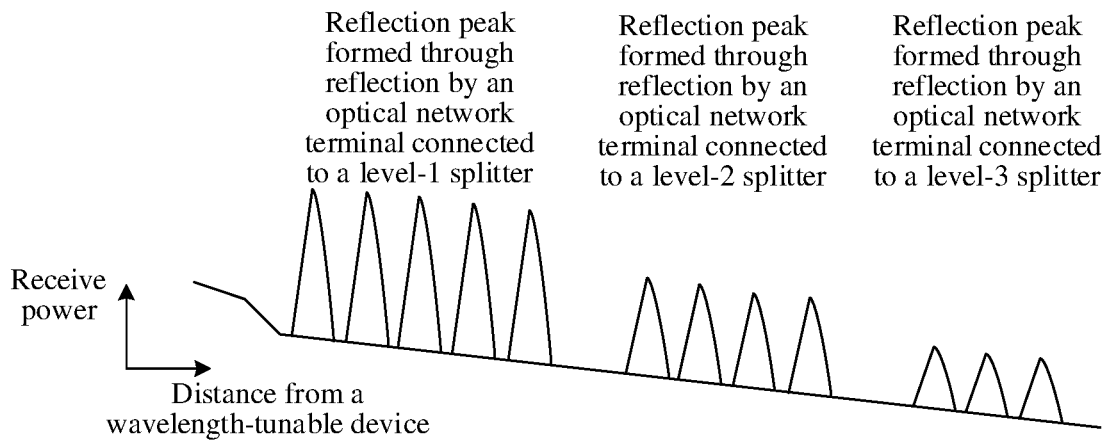
FIG. 18 is a schematic diagram of reflection peaks formed by different ONTs according to an example of an embodiment of this application.

As shown in FIG. 18, the wavelength-tunable device emits the test light of λ9. Because the reflection component of the port 9 of each of the level-1 splitter to a level-n splitter reflects the test light of λ9, receive power of the test light of λ9 received by the ONTs respectively connected to the level-2 splitter and the level-3 splitter decreases. In addition, a height of a reflection peak formed by the ONTs respectively connected to the level-1 splitter, the level-2 splitter, and the level-3 splitter by reflecting the test light of λ9 decreases gradually. Therefore, the level number of the splitter corresponding to each reflection peak group may be obtained.)

Figure 19:
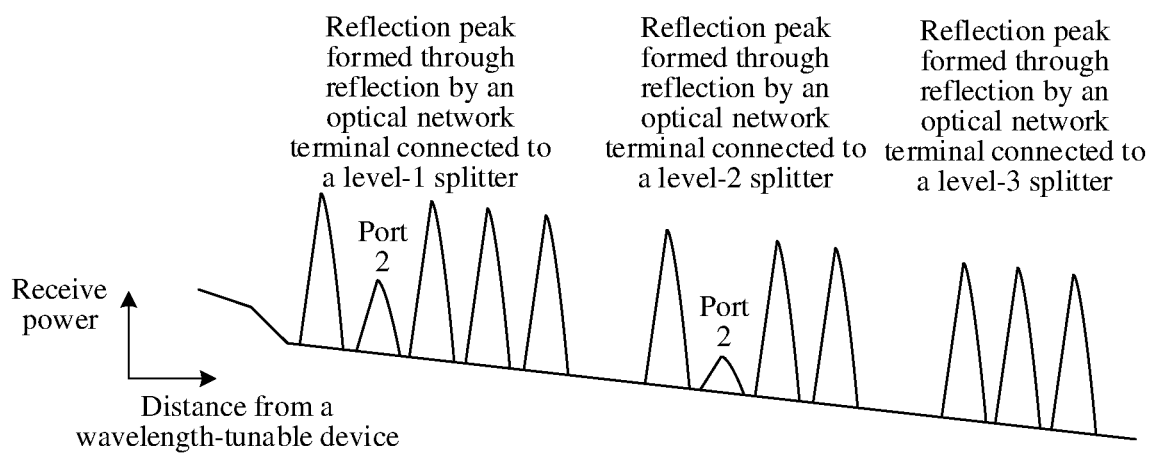
FIG. 19 is a schematic diagram of reflection peaks formed by different ONTs according to an example of an embodiment of this application.

As shown in FIG. 19, the wavelength-tunable device emits test light of λn(n∈1□8). Because the test light of λn is reflected by a reflection component of a port n of a splitter at each level, receive power of the test light of λn received by an ONT connected to the port n of the splitter at each level decreases, so that a height of a reflection peak formed by the ONT connected to the port n of the splitter at each level by reflecting the test light of λn decreases. Therefore, the port of the splitter corresponding to each reflection peak group may be determined. FIG. 19 shows a case in which λn is λ2. In this way, the port of the splitter corresponding to each reflection peak group may be obtained with reference to results obtained in FIG. 18 and FIG. 19. For example, it may be obtained that the ONT2 is connected to the port 2 of the level-1 splitter, and that the ONT6 is connected to the port 2 of the level-2 splitter.

It should be noted that, in FIG. 17 to FIG. 19, a reason why a reference point in a height direction of each reflection peak is different is that transmission distances between the ONTs and the wavelength-tunable device are different, and optical fiber losses are also different. A larger transmission distance indicates a larger optical fiber loss. This causes a lower reference point.

In a possible implementation, when the first transmission information is a location and a height, the second transmission information is a transmission distance and a transmission loss. Processing of determining the port of the splitter connected to each ONT in step 1103 may be as follows.

A transmission distance between the ONT to which each reflection peak group belongs and the wavelength-tunable device is determined based on the location of the reflection peak formed by the target test light in each reflection peak group. A transmission loss between the ONT to which each reflection peak group belongs and the wavelength-tunable device is determined based on the height of the reflection peak formed by the target test light in each reflection peak group. A reflection peak group corresponding to each ONT is determined based on a transmission distance and a transmission loss between each ONT and the OLT, and the transmission distance and the transmission loss between the ONT to which each reflection peak group belongs and the wavelength-tunable device. The port of the splitter connected to each ONT is determined based on the reflection peak group corresponding to each ONT and the port of the splitter corresponding to each reflection peak group.

In this embodiment, the port identification device may determine the location of the reflection peak formed by the target test light in each reflection peak group as the transmission distance between the ONT to which each reflection peak group belongs and the wavelength-tunable device. The transmission distance may be referred to as a first transmission distance. In addition, the port identification device may determine, by using the height of the reflection peak formed by the target test light in each reflection peak group and power of the target test light emitted by the wavelength-tunable device, the transmission loss between the ONT to which each reflection peak group belongs and the wavelength-tunable device. The transmission loss may be referred to as a first transmission loss. The first transmission loss is equal to the power of the target test light emitted by the wavelength-tunable device minus the height of the reflection peak formed by the target test light, and then divided by 2.

Then, the port identification device obtains the transmission distance (which may be referred to as a second transmission distance) and the transmission loss (which may be referred to as a second transmission loss) between each ONT and the OLT. An ONT whose absolute value of a difference between the first transmission distance and the second transmission distance is less than a preset transmission distance, and whose absolute value of a difference between the first transmission loss and the second transmission loss is less than a preset transmission loss is enabled to correspond to a reflection peak group, to obtain the reflection peak group corresponding to each ONT. For example, Table 1 shows a table in which an ONT corresponds to a reflection peak when the first transmission distance is close to the second transmission distance, and the first transmission loss is close to the second transmission loss.

TABLE 1

| Reflection peak | First transmission loss | First transmission distance | ONT | Second transmission loss | Second transmission distance |
|---|---|---|---|---|---|
| Reflection peak group 1 | 23.3 dB | 503 m | ONT1 | 22.2 dB | 770 m |
| Reflection peak group 2 | 25.3 dB | 783 m | ONT2 | 24.4 dB | 875 m |
| Reflection peak group 3 | 22.2 dB | 775 m | ONT3 | 23.6 dB | 508 m |
| Reflection peak group 4 | 24.5 dB | 880 m | ONT4 | 25.6 dB | 785 m |

In Table 1, the reflection peak group 1 corresponds to the ONT3, the reflection peak group 2 corresponds to the ONT4, the reflection peak group 3 corresponds to the ONT1, and the reflection peak group 4 corresponds to the ONT2.

Then, the port of the splitter corresponding to the reflection peak group corresponding to the ONT is determined as the port corresponding to the ONT in the splitter. In this way, because both the transmission distance and the transmission loss are used, the obtained port corresponding to the ONT in the splitter can be more accurate.

It should be noted herein that, because the transmission distance between the wavelength-tunable device and the ONT is close to the transmission distance between the OLT and the ONTs, it may be determined whether the two ONTs are the same based on the equal or close distance.

In a possible implementation, when the first transmission information is a location, the second transmission information is a transmission distance. A processing progress of determining the port of the splitter connected to each ONT in step 1103 is as follows.

A transmission distance between the ONT to which each reflection peak group belongs and the wavelength-tunable device is determined based on the location of the reflection peak formed by the target test light in each reflection peak group. A reflection peak group corresponding to each ONT is determined based on a transmission distance between each ONT and the OLT, and the transmission distance between the ONT to which each reflection peak group belongs and the wavelength-tunable device. The port of the splitter connected to each ONT is determined based on the reflection peak group corresponding to each ONT and the port of the splitter corresponding to each reflection peak group.

Compared with the process of using the transmission distance and the transmission loss, this process uses only the transmission distance, and other processing is the same as that described above.

In a possible implementation, when the first transmission information is a height, the second transmission information is a transmission loss. A processing progress of determining the port corresponding to each ONT in the splitter in step 1103 is as follows.

A transmission loss between the ONT to which each reflection peak group belongs and the wavelength-tunable device is determined based on the height of the reflection peak formed by the target test light in each reflection peak group. A reflection peak group corresponding to each ONT is determined based on a transmission loss between each ONT and the OLT, and the transmission loss between the ONT to which each reflection peak group belongs and the wavelength-tunable device. The port corresponding to each ONT in the splitter is determined based on the reflection peak group corresponding to each ONT and the port of the splitter corresponding to each reflection peak group.

Compared with the process of using the transmission distance and the transmission loss, this process uses only the transmission loss, and other processing is the same as that described above.

In a possible implementation, when the first transmission information is time information and a height, the second transmission information is transmission duration and a transmission loss. Processing of determining the port of the splitter connected to each ONT in step 1103 may be as follows.

The time information of the reflection peak formed by the target test light in each reflection peak group is determined as transmission duration between the ONT to which each reflection peak group belongs and the wavelength-tunable device. A transmission loss between the ONT to which each reflection peak group belongs and the wavelength-tunable device is determined based on the height of the reflection peak formed by the target test light in each reflection peak group. A reflection peak group corresponding to each ONT is determined based on transmission duration and a transmission loss between each ONT and the OLT, and the transmission duration and the transmission loss between the ONT to which each reflection peak group belongs and the wavelength-tunable device. The port of the splitter connected to each ONT is determined based on the reflection peak group corresponding to each ONT and the port of the splitter corresponding to each reflection peak group.

In this embodiment, the port identification device may determine the time information of the reflection peak formed by the target test light in each reflection peak group as the transmission duration between the ONT to which each reflection peak group belongs and the wavelength-tunable device. The transmission duration may be referred to as first transmission duration. In addition, the port identification device may determine, by using the height of the reflection peak formed by the target test light in each reflection peak group and power of the target test light emitted by the wavelength-tunable device, the transmission loss between the ONT to which each reflection peak group belongs and the wavelength-tunable device. The transmission loss may be referred to as a first transmission loss.

Then, the port identification device obtains the transmission duration (which may be referred to as second transmission duration) and the transmission loss (which may be referred to as a second transmission loss) between each ONT and the OLT. An ONT whose absolute value of a difference between the first transmission duration and the second transmission duration is less than preset transmission duration, and whose absolute value of a difference between the first transmission loss and the second transmission loss is less than a preset transmission loss is enabled to correspond to a reflection peak group, to obtain the reflection peak group corresponding to each ONT. Then, the port of the splitter corresponding to the reflection peak group corresponding to the ONT is determined as the port corresponding to the ONT in the splitter. In this way, because both the transmission duration and the transmission loss are used, the obtained port corresponding to the ONT in the splitter can be more accurate.

In a possible implementation, when the first transmission information is time information, the second transmission information is transmission duration. A processing progress of determining the port of the splitter connected to each ONT in step 1103 is as follows.

The time information of the reflection peak formed by the target test light in each reflection peak group is determined as transmission duration between the ONT to which each reflection peak group belongs and the wavelength-tunable device. A reflection peak group corresponding to each ONT is determined based on transmission duration between each ONT and the OLT, and the transmission duration between the ONT to which each reflection peak group belongs and the wavelength-tunable device. The port of the splitter connected to each ONT is determined based on the reflection peak group corresponding to each ONT and the port of the splitter corresponding to each reflection peak group.

Compared with the process of using the transmission duration and the transmission loss, this process uses only the transmission duration, and other processing is the same as that described above.

In a possible implementation, this embodiment of this application further provides a process of obtaining the second transmission information.

The port identification device sends an obtaining request of the second transmission information to each ONT, and receives the second transmission information separately sent by the at least one ONT.

In this embodiment, the port identification device sends the obtaining request of the second transmission information to each ONT. The obtaining request carries sending time and transmit power. Each ONT has a module for testing the transmission distance and the transmission loss between the ONT and the OLT. After receiving the obtaining request, each ONT records receiving time and receive power. Then, the sending time is subtracted from the receiving time to obtain a time difference, and the transmission distance between the ONT and the OLT is obtained by multiplying the foregoing formula (1) by 2. In addition, the transmit power is subtracted from the receive power to obtain the transmission loss between the ONT and the OLT. In this way, the second transmission information may be obtained. The second transmission information includes the transmission distance and/or the transmission loss. Alternatively, the port identification device sends an obtaining request of the second transmission information to each ONT. The obtaining request carries sending time and transmit power. Each ONT has a module for testing the transmission duration and the transmission loss between the ONT and the OLT. After receiving the obtaining request, each ONT records receiving time and receive power. Then, the sending time is subtracted from the receiving time to obtain a time difference, and the time difference is determined as the transmission duration between the ONT and the OLT. In addition, the transmit power is subtracted from the receive power to obtain the transmission loss between the ONT and the OLT. In this way, the second transmission information may be obtained. The second transmission information includes the transmission duration and/or the transmission loss.

Then, the ONT sends the obtained second transmission information to the port identification device. In this way, the port identification device receives the second transmission information.

Certainly, the second transmission information between the ONT and the OLT may alternatively be disposed by a user and stored in the port identification device.

In this embodiment of this application, it should be noted that the ONT is connected to the port of the splitter through the optical fiber, and a distance between each ONT and the connected port of the splitter is generally different. Therefore, in the manner in this embodiment of this application, the port corresponding to the ONT in the splitter may be identified.

In this embodiment of this application, the port of the splitter connected to the ONT may be determined by using the reflection peak formed by the ONT by reflecting the test light. In addition, the port of the splitter connected to the ONT may be automatically and accurately identified.

Figure 20:
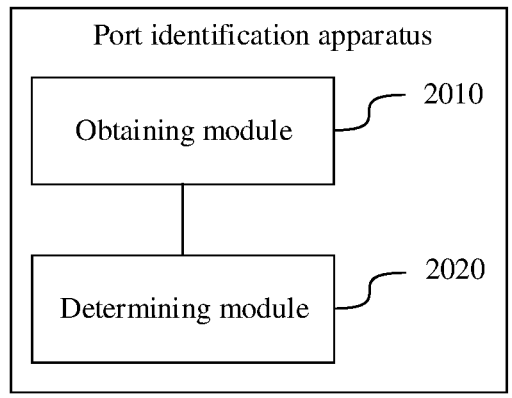
FIG. 20 is a schematic diagram of a structure of a port identification apparatus according to an example of an embodiment of this application.

FIG. 20 is a structural diagram of a port identification apparatus according to an embodiment of this application. The apparatus may be implemented as a part or all of the apparatus by using software, hardware, or a combination of the two. The apparatus is used in a PON. The apparatus provided in this embodiment of this application may implement the procedure described in FIG. 11 in embodiments of this application. The apparatus includes: an obtaining module 2010 and a determining module 2020.

The obtaining module 2010 is configured to obtain reflection information of reflection peaks formed by each ONT by separately reflecting test light when the test light provided by a wavelength-tunable device is transmitted in a PON. The test light includes test light reflected by reflection components of ports of at least one level of splitter. The reflection information includes at least heights of the reflection peaks.

The determining module 2020 is configured to:
determine, based on the reflection information of the reflection peaks, a port of a splitter corresponding to each reflection peak group, where each reflection peak group includes reflection peaks formed by a same ONT by reflecting the test light; and
determine, based on first transmission information corresponding to at least one reflection peak in each reflection peak group, the port of the splitter corresponding to each reflection peak group, and second transmission information between each ONT and an OLT, a port corresponding to each ONT in the splitter.

In a possible implementation, the determining module 2020 is configured to:
determine, based on locations and the heights of the reflection peaks, the port of the splitter corresponding to each reflection peak group; or
determine, based on time information and the heights of the reflection peaks, the port of the splitter corresponding to each reflection peak group. Time information of any reflection peak is duration used by the wavelength-tunable device to transmit test light corresponding to the reflection peak to an ONT corresponding to the reflection peak.

In a possible implementation, when the first transmission information is a location, the second transmission information is a transmission distance; when the first transmission information is a height, the second transmission information is a transmission loss; when the first transmission information is a location and a height, the second transmission information is a transmission distance and a transmission loss; when the first transmission information is time information, the second transmission information is transmission duration; or when the first transmission information is time information and a transmission loss, the second transmission information is transmission duration and a transmission loss. The time information of any reflection peak is the duration used by the wavelength-tunable device to transmit the test light corresponding to the reflection peak to the ONT corresponding to the reflection peak.

In a possible implementation, the obtaining module 2010 is further configured to:

obtain reflection information of a reflection peak formed by each ONT by reflecting target test light when the target test light provided by the wavelength-tunable device is transmitted in the PON. A wavelength of the target test light is different from wavelengths of the test light reflected by the reflection components of the ports of the at least one level of splitter.

The determining module 2020 is configured to:

determine, based on the locations and the heights of the reflection peaks and a location and a height of the reflection peak formed by the target test light, the port of the splitter corresponding to each reflection peak group.

In a possible implementation, the at least one level of splitter is an even splitter, the at least one level of splitter is n levels of splitters, and n is greater than or equal to 2. The at least one ONT is connected to a level-n splitter. Wavelengths of test light reflected by reflection components of ports of different levels of splitters are different.

The determining module 2020 is configured to:

determine, based on the location and the height of the reflection peak formed by the target test light and a location and a height of a reflection peak formed by test light of a level-(i−1) splitter in the test light, a reflection peak corresponding to a same level-i splitter in each reflection peak group, and a port of the level-(i−1) splitter connected to a level-i splitter, where the test light of the level-(i−1) splitter is test light reflected by a reflection component of the port of the level-(i−1) splitter, and i is greater than 1 and less than or equal to n;

determine, based on the location and the height of the reflection peak formed by the target test light and a location and a height of a reflection peak formed by test light of the level-n splitter in the test light, a port of the level-n splitter corresponding to each reflection peak group, where the test light of the level-n splitter is test light reflected by a reflection component of the port of the level-n splitter; and determine, based on the reflection peak corresponding to the same level-i splitter in each reflection peak group, the port of the level-(i−1) splitter connected to the level-i splitter, and the port of the level-n splitter corresponding to each reflection peak group, the port of the splitter corresponding to each reflection peak group.

In a possible implementation, the at least one level of splitter is an even splitter, the at least one level of splitter is n levels of splitters, and n is greater than or equal to 2. The at least one ONT is connected to a level-n splitter. Wavelengths of test light reflected by reflection components of ports of different levels of splitters are the same.

The determining module 2020 is configured to:

determine the reflection peak group based on the locations of the reflection peaks formed by the test light and the location of the reflection peak formed by the target test light; and determine, for a reflection peak group j, based on differences between the height of the reflection peak formed by the target test light and the heights of the reflection peaks formed by the test light in the reflection peak group j, a port of a splitter corresponding to the reflection peak group j.

In a possible implementation, the at least one level of splitter is an uneven splitter, the at least one level of splitter is n levels of splitters, and n is greater than or equal to 2.

The determining module 2020 is configured to:

determine, based on the location and the height of the reflection peak formed by the target test light and a location and a height of a reflection peak formed by test light corresponding to a first port of the at least one level of splitter, a level number of the splitter corresponding to each reflection peak group, where the test light corresponding to the first port is test light reflected by a reflection component of the first port;

determine, based on the location and the height of the reflection peak formed by the target test light and a location and a height of a reflection peak formed by test light corresponding to a second port of the at least one level of splitter, a port of a splitter that is directly connected to an ONT to which each reflection peak group belongs, where the test light corresponding to the second port is test light reflected by a reflection component of the second port; and determine, based on the level number of the splitters corresponding to each reflection peak group and the port of the splitter that is directly connected to the ONT to which each reflection peak group belongs, the port of the splitter corresponding to each reflection peak group.

In a possible implementation, when the first transmission information is a location and a height, the second transmission information is a transmission distance and a transmission loss.

The determining module 2020 is configured to:

determine, based on the location of the reflection peak formed by the target test light in each reflection peak group, a transmission distance between the ONT to which each reflection peak group belongs and the wavelength-tunable device, and determine, based on the height of the reflection peak formed by the target test light in each reflection peak group, a transmission loss between the ONT to which each reflection peak group belongs and the wavelength-tunable device;

determine, based on a transmission distance and a transmission loss between each ONT and the OLT, and the transmission distance and the transmission loss between the ONT to which each reflection peak group belongs and the wavelength-tunable device, a reflection peak group corresponding to each ONT; and determine, based on the reflection peak group corresponding to each ONT and the port of the splitter corresponding to each reflection peak group, the port corresponding to each ONT in the splitter.

In a possible implementation, in an optical fiber used by the at least one ONT to connect to the splitter, a reflection component that reflects the test light is disposed at a location of an interface connected to the at least one ONT. Alternatively, a reflection component that reflects the test light is disposed inside the at least one ONT.

Figure 21:
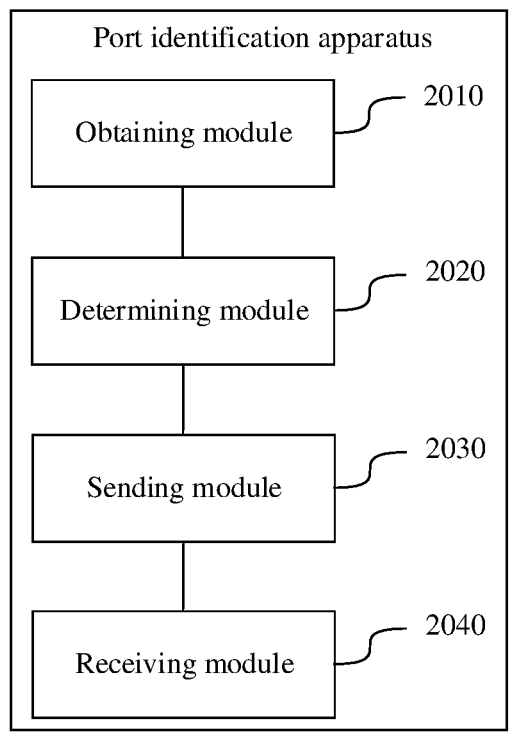
FIG. 21 is a schematic diagram of a structure of a port identification apparatus according to an example of an embodiment of this application.

In a possible implementation, as shown in FIG. 21, the apparatus further includes:

a sending module 2030, configured to send an obtaining request of the second transmission information to each ONT; and a receiving module 2040, configured to receive the second transmission information separately sent by the at least one ONT.

In a possible implementation, as shown in FIG. 21, the sending module 2030 is configured to send a test command to the wavelength-tunable device, where the test command includes the wavelengths of the test light, or the test command includes the wavelengths and an emitting sequence of the test light; and the obtaining module 2010 is configured to:

receive the reflection information of the reflection peaks formed by each ONT by separately reflecting the test light when the test light sent by the wavelength-tunable device is transmitted in the PON.

Division into the modules in embodiments of this application is an example, is merely division into logical functions, and may be other division during actual implementation. In addition, functional modules in embodiments of this application may be integrated into one processor, each of the modules may exist alone physically, or two or more modules may be integrated into one module. The integrated module may be implemented in a form of hardware, or may be implemented in a form of a software functional module.

All or a part of the foregoing embodiments may be implemented by using software, hardware, firmware, or any combination thereof. When the software is used to implement the embodiments, all or a part of the embodiments may be implemented in a form of a computer program product. The computer program product includes one or more computer instructions. When the computer program instructions are loaded and executed on a port identification device, the procedures or functions according to embodiments of this application are all or partially generated. The computer instructions may be stored in a computer-readable storage medium, or may be transmitted from a computer-readable storage medium to another computer-readable storage medium. The computer-readable storage medium may be any usable medium accessible by the port identification device, or a data storage device, such as a server or a data center, integrating one or more usable media. The usable medium may be a magnetic medium (for example, a floppy disk, a hard disk, or a magnetic tape), an optical medium (for example, a digital video disc (DVD)), or a semiconductor medium (for example, a solid-state drive).

What is claimed is:

1. A method, wherein the method is applied to a passive optical network (PON), the PON comprises at least one splitter comprised in at least one level of splitter, and the PON further comprises at least one optical network terminal (ONT), each ONT of the at least one ONT is separately connected to a different port of ports of the at least one splitter through an optical fiber, reflection components are disposed on the ports of the at least one splitter, wavelengths of test lights reflected by reflection components of different ports of a same splitter of the at least one splitter are different, and the method comprises:

obtaining reflection information of reflection peaks formed by each ONT of the at least one ONT by separately reflecting a test light when the test lights that are provided by a wavelength-tunable device are transmitted in the PON, wherein the test lights comprise test lights reflected by the reflection components of the ports of the at least one splitter, the reflection information comprises at least heights of the reflection peaks;

determining, based on the reflection information of the reflection peaks, a port of a splitter of the at least one splitter corresponding to each reflection peak group, wherein each reflection peak group comprises reflection peaks formed by a same ONT by reflecting the test lights; and determining, based on first transmission information corresponding to at least one reflection peak in each reflection peak group, the port of the splitter of the at least one splitter that corresponds to each reflection peak group, and second transmission information between each ONT and an optical line terminal (OLT), the port corresponding to each ONT in the at least one splitter; and wherein determining, based on the reflection information of the reflection peaks, the port of the splitter of the at least one splitter corresponding to each reflection peak group comprises:

determining, based on locations and the heights of the reflection peaks, the port of the splitter of the at least one splitter corresponding to each reflection peak group; or determining, based on time information and the heights of the reflection peaks, the port of the splitter of the at least one splitter corresponding to each reflection peak group, wherein time information of any reflection peak is a duration used by the wavelength-tunable device to transmit test light corresponding to the reflection peak to an ONT corresponding to the reflection peak.

2. The method according to claim 1, wherein:

when the first transmission information is a location, the second transmission information is a transmission distance;

when the first transmission information is a height, the second transmission information is a transmission loss;

when the first transmission information is a location and a height, the second transmission information is a transmission distance and a transmission loss;

when the first transmission information is time information, the second transmission information is transmission duration; or when the first transmission information is time information and a transmission loss, the second transmission information is a transmission duration and a transmission loss.

3. The method according to claim 1, further comprising:

obtaining reflection information of a reflection peak formed by each ONT by reflecting target test light when the target test light provided by the wavelength-tunable device is transmitted in the PON, wherein a wavelength of the target test light is different from the wavelengths of the test lights reflected by the reflection components of the ports of the at least one splitter; and wherein determining, based on locations and the heights of the reflection peaks, the port of the splitter of the at least one splitter corresponding to each reflection peak group comprises:

determining, based on the locations and the heights of the reflection peaks and a location and a height of the reflection peak formed by the target test light, the port of the splitter of the at least one splitter corresponding to each reflection peak group.

4. The method according to claim 3, wherein the at least one splitter is an even splitter, the at least one level of splitter is n levels of splitters, n is greater than or equal to 2, the at least one ONT is connected to a level-n splitter of the at least one splitter, and wavelengths of the test lights reflected by reflection components of ports of different levels of splitters are different; and wherein determining, based on the locations and the heights of the reflection peaks and the location and the height of the reflection peak formed by the target test light, the port of the splitter of the at least one splitter corresponding to each reflection peak group comprises:

determining, based on the location and the height of the reflection peak formed by the target test light and a location and a height of a reflection peak formed by test light of a level-(i−1) splitter in the test light, a reflection peak corresponding to a same level-i splitter in each reflection peak group, and a port of the level-(i−1) splitter connected to a level-i splitter, wherein the test light of the level-(i−1) splitter is test light reflected by a reflection component of the port of the level-(i−1) splitter, and i is greater than 1 and less than or equal to n;

determining, based on the location and the height of the reflection peak formed by the target test light and a location and a height of a reflection peak formed by test light of the level-n splitter in the test light, a port of the level-n splitter corresponding to each reflection peak group, wherein the test light of the level-n splitter is test light reflected by a reflection component of the port of the level-n splitter; and determining, based on the reflection peak corresponding to the same level-i splitter in each reflection peak group, the port of the level-(i−1) splitter connected to the level-i splitter, and the port of the level-n splitter corresponding to each reflection peak group, the port of the splitter corresponding to each reflection peak group.

5. The method according to claim 3, wherein the at least one splitter is an even splitter, the at least one level of splitter is n levels of splitters, n is greater than or equal to 2, the at least one ONT is connected to a level-n splitter of the at least one splitter, and wavelengths of the test lights reflected by reflection components of ports of different levels of splitters are the same; and wherein determining, based on the locations and the heights of the reflection peaks and the location and the height of the reflection peak formed by the target test light, the port of the splitter of the at least one splitter corresponding to each reflection peak group comprises:

determining each reflection peak group based on the locations of the reflection peaks formed by the test lights and the location of the reflection peak formed by the target test light; and determining, for a reflection peak group j, based on differences between the height of the reflection peak formed by the target test light and the heights of the reflection peaks formed by the test lights in the reflection peak group j, a port of a splitter of the at least one splitter corresponding to the reflection peak group j, wherein j is an integer.

6. The method according to claim 3, wherein the at least one level of splitter is an uneven splitter, the at least one level of splitter is n levels of splitters, and n is greater than or equal to 2; and wherein determining, based on the locations and the heights of the reflection peaks and the location and the height of the reflection peak formed by the target test light, the port of the splitter of the at least one splitter corresponding to each reflection peak group comprises:

determining, based on the location and the height of the reflection peak formed by the target test light and a location and a height of a reflection peak formed by test light corresponding to a first port of the at least one splitter, a level number of the splitter of the at least one splitter corresponding to each reflection peak group, wherein the test light corresponding to the first port is test light reflected by a reflection component of the first port;

determining, based on the location and the height of the reflection peak formed by the target test light and a location and a height of a reflection peak formed by test light corresponding to a second port of the at least one splitter, a port of a splitter of the at least one splitter that is directly connected to an ONT to which each reflection peak group belongs, wherein the test light corresponding to the second port is test light reflected by a reflection component of the second port; and determining, based on the level number of the splitter corresponding to each reflection peak group and the port of the splitter that is directly connected to the ONT to which each reflection peak group belongs, the port of the splitter of the at least one splitter corresponding to each reflection peak group.

7. The method according to claim 1, wherein when the first transmission information is a location and a height, the second transmission information is a transmission distance and a transmission loss; and wherein determining, based on the first transmission information corresponding to at least one reflection peak in each reflection peak group, the port of the splitter of the at least one splitter corresponding to each reflection peak group, and the second transmission information between each ONT and an OLT, the port corresponding to each ONT in the at least one splitter comprises:

determining, based on the location of the reflection peak formed by target test light in each reflection peak group, a transmission distance between the ONT to which each reflection peak group belongs and the wavelength-tunable device, and determining, based on the height of the reflection peak formed by the target test light in each reflection peak group, a transmission loss between the ONT to which each reflection peak group belongs and the wavelength-tunable device;

determining, based on a transmission distance and a transmission loss between each ONT and the OLT, and the transmission distance and the transmission loss between the ONT to which each reflection peak group belongs and the wavelength-tunable device, a reflection peak group corresponding to each ONT; and determining, based on the reflection peak group corresponding to each ONT and the port of the splitter of the at least one splitter corresponding to each reflection peak group, the port corresponding to each ONT in the at least one splitter.

8. The method according to claim 1, wherein in the optical fiber used by the at least one ONT to connect to the at least one splitter:

a reflection component that reflects a corresponding test light is disposed at a location of an interface connected to the at least one ONT; or a reflection component that reflects a corresponding test light is disposed inside the at least one ONT.

9. The method according to claim 1, further comprising:
sending an obtaining request of the second transmission information to each ONT; and
receiving the second transmission information separately sent by the at least one ONT.

10. The method according to claim 1, further comprising:
sending a test command to the wavelength-tunable device, wherein the test command comprises the wavelengths of the test lights, or the test command comprises the wavelengths and an emitting sequence of the test lights; and
wherein obtaining the reflection information of the reflection peaks formed by each ONT by separately reflecting the test lights when the test lights provided by the wavelength-tunable device are transmitted in the PON comprises:
receiving the reflection information of the reflection peaks formed by each ONT by separately reflecting the test lights when the test lights sent by the wavelength-tunable device are transmitted in the PON.

11. A device configured to be applied in a passive optical network (PON), wherein the PON comprises at least one splitter comprised in at least one level of splitter, and the PON further comprises at least one optical network terminal (ONT), each ONT of the at least one ONT is separately connected to a different port of ports of the at least one splitter through an optical fiber, reflection components are disposed on the ports of the at least one splitter, wavelengths of test lights reflected by reflection components of different ports of a same splitter of the at least one splitter are different, and the device comprises:
at least one processor; and
a memory storing computer instructions; and
wherein when the at least one processor executes the computer instructions the device is caused to:
obtain reflection information of reflection peaks formed by each ONT by separately reflecting test lights when the test lights provided by a wavelength-tunable device are transmitted in the PON, wherein the test lights comprise test lights reflected by the reflection components of the ports of the at least one splitter, and the reflection information comprises at least heights of the reflection peaks;
determining, based on the reflection information of the reflection peaks, a port of a splitter of the at least one splitter corresponding to each reflection peak group, wherein each reflection peak group comprises reflection peaks formed by a same ONT by reflecting the test lights; and
determining, based on first transmission information corresponding to at least one reflection peak in each reflection peak group, the port of the splitter of the at least one splitter corresponding to each reflection peak group, and second transmission information between each ONT and an optical line terminal (OLT), the port corresponding to each ONT in the at least one splitter; and
wherein determining, based on the reflection information of the reflection peaks, the port of the splitter of the at least one splitter corresponding to each reflection peak group comprises:
determining, based on locations and the heights of the reflection peaks, the port of the splitter of the at least one splitter corresponding to each reflection peak group; or
determining, based on time information and the heights of the reflection peaks, the port of the splitter of the at least one splitter corresponding to each reflection peak group, wherein time information of any reflection peak is a duration used by the wavelength-tunable device to transmit test light corresponding to the reflection peak to an ONT corresponding to the reflection peak.

12. The device according to claim 11, wherein:
when the first transmission information is a location, the second transmission information is a transmission distance;
when the first transmission information is a height, the second transmission information is a transmission loss;
when the first transmission information is a location and a height, the second transmission information is a transmission distance and a transmission loss;
when the first transmission information is time information, the second transmission information is transmission duration; or
when the first transmission information is time information and a transmission loss, the second transmission information is transmission duration and a transmission loss.

13. The device according to claim 11, wherein when the at least one processor executes the computer instructions the device is further caused to:
obtain reflection information of a reflection peak formed by each ONT by reflecting target test light when the target test light provided by the wavelength-tunable device is transmitted in the PON, wherein a wavelength of the target test light is different from the wavelengths of the test lights reflected by the reflection components of the ports of the at least one splitter; and
wherein determining, based on locations and the heights of the reflection peaks, the port of the splitter of the at least one splitter corresponding to each reflection peak group comprises:
determining, based on the locations and the heights of the reflection peaks and a location and a height of the reflection peak formed by the target test light, the port of the splitter of the at least one splitter corresponding to each reflection peak group.

14. The device according to claim 13, wherein the at least one splitter is an even splitter, the at least one level of splitter is n levels of splitters, n is greater than or equal to 2, the at least one ONT is connected to a level-n splitter, and wavelengths of the test lights reflected by reflection components of ports of different levels of splitters are different; and
wherein determining, based on the locations and the heights of the reflection peaks and the location and the height of the reflection peak formed by the target test light, the port of the splitter of the at least one splitter corresponding to each reflection peak group comprises:
determining, based on the location and the height of the reflection peak formed by the target test light and a location and a height of a reflection peak formed by test light of a level-(i−1) splitter in the test light, a reflection peak corresponding to a same level-i splitter in each reflection peak group, and a port of the level-(i−1) splitter connected to a level-i splitter, wherein the test light of the level-(i−1) splitter is test light reflected by a reflection component of the port of the level-(i−1) splitter, and i is greater than 1 and less than or equal to n;
determining, based on the location and the height of the reflection peak formed by the target test light and a location and a height of a reflection peak formed by test light of the level-n splitter in the test light, a port of the level-n splitter corresponding to each reflection peak group, wherein the test light of the level-n splitter is test light reflected by a reflection component of the port of the level-n splitter; and
determining, based on the reflection peak corresponding to the same level-i splitter in each reflection peak group, the port of the level-(i−1) splitter connected to the level-i splitter, and the port of the level-n splitter corresponding to each reflection peak group, the port of the splitter of the at least one splitter corresponding to each reflection peak group.

15. The device according to claim 13, wherein the at least one splitter is an even splitter, the at least one level of splitter is n levels of splitters, n is greater than or equal to 2, the at least one ONT is connected to a level-n splitter, and wavelengths of the test lights reflected by reflection components of ports of different levels of splitters are the same; and wherein determining, based on the locations and the heights of the reflection peaks and the location and the height of the reflection peak formed by the target test light, the port of the splitter of the at least one splitter corresponding to each reflection peak group comprises:
determining the reflection peak group based on the locations of the reflection peaks formed by the test lights and the location of the reflection peak formed by the target test light; and
determining, for a reflection peak group j, based on differences between the height of the reflection peak formed by the target test light and the heights of the reflection peaks formed by the test light in the reflection peak group j, a port of a splitter corresponding to the reflection peak group j, wherein j is an integer.

16. The device according to claim 13, wherein the at least one splitter is an uneven splitter, the at least one level of splitter is n levels of splitters, and n is greater than or equal to 2; and wherein determining, based on the locations and the heights of the reflection peaks and the location and the height of the reflection peak formed by the target test light, the port of the splitter of the at least one splitter corresponding to each reflection peak group comprises:
determining, based on the location and the height of the reflection peak formed by the target test light and a location and a height of a reflection peak formed by test light corresponding to a first port of the at least one splitter, a level number of the splitter of the at least one splitter corresponding to each reflection peak group, wherein the test light corresponding to the first port is test light reflected by a reflection component of the first port;
determining, based on the location and the height of the reflection peak formed by the target test light and a location and a height of a reflection peak formed by test light corresponding to a second port of the at least one splitter, a port of a splitter of the at least one splitter that is directly connected to an ONT to which each reflection peak group belongs, wherein the test light corresponding to the second port is test light reflected by a reflection component of the second port; and
determining, based on the level number of the splitter of the at least one splitter corresponding to each reflection peak group and the port of the splitter of the at least one splitter that is directly connected to the ONT to which each reflection peak group belongs, the port of the splitter of the at least one splitter corresponding to each reflection peak group.

17. The device according to claim 11, wherein in the optical fiber used by the at least one ONT to connect to the at least one splitter:
a reflection component that reflects a corresponding test light is disposed at a location of an interface connected to the at least one ONT; or
a reflection component that reflects a corresponding test light is disposed inside the at least one ONT.

18. A port identification system, configured to be used in a passive optical network (PON), wherein the PON comprises at least one splitter comprised in at least one level of splitter, and the PON further comprises at least one optical network terminal (ONT), each ONT of the at least one ONT is separately connected to a different port of ports of the at least one splitter through an optical fiber, reflection components are disposed on the ports of the at least one splitter, wavelengths of test lights reflected by reflection components of different ports of a same splitter of the at least one splitter are different, and wherein the system comprises:

a wavelength-tunable device, configured to output the test lights of a plurality of wavelengths, and configured to record reflection information of reflection peaks; and
a port identification device having a communication connection to the wavelength-tunable device, and the port identification device is configured to:
obtain reflection information of reflection peaks formed by each ONT by separately reflecting the test lights when the test lights provided by the wavelength-tunable device are transmitted in the PON, wherein the test lights comprise test lights reflected by the reflection components of the ports of the at least one splitter, and the reflection information comprises at least heights of the reflection peaks;
determine, based on the reflection information of the reflection peaks, a port of a splitter of the at least one splitter corresponding to each reflection peak group, wherein each reflection peak group comprises reflection peaks formed by a same ONT by reflecting the test light; and
determine, based on first transmission information corresponding to at least one reflection peak in each reflection peak group, the port of the splitter of the at least one splitter corresponding to each reflection peak group, and second transmission information between each ONT and an optical line terminal (OLT), the port corresponding to each ONT in the at least one splitter; and
wherein determining, based on the reflection information of the reflection peaks, the port of the splitter of the at least one splitter corresponding to each reflection peak group comprises:
determining, based on locations and the heights of the reflection peaks, the port of the splitter of the at least one splitter corresponding to each reflection peak group; or
determining, based on time information and the heights of the reflection peaks, the port of the splitter of the at least one splitter corresponding to each reflection peak group, wherein time information of any reflection peak is a duration used by the wavelength-tunable device to transmit test light corresponding to the reflection peak to an ONT corresponding to the reflection peak.

19. The system according to claim 18, wherein:
when the first transmission information is a location, the second transmission information is a transmission distance; or
when the first transmission information is a height, the second transmission information is a transmission loss.

20. The system according to claim 18, wherein:
when the first transmission information is time information, the second transmission information is transmission duration; or
when the first transmission information is time information and a transmission loss, the second transmission information is a transmission duration and a transmission loss.

* * * * *